United States Patent
Frieder, Jr. et al.

(10) Patent No.: US 11,089,832 B2
(45) Date of Patent: Aug. 17, 2021

(54) HELMET IMPACT ATTENUATION ARTICLE

(71) Applicant: Gentex Corporation, Simpson, PA (US)

(72) Inventors: Leonard P. Frieder, Jr., Dalton, PA (US); George D. Hedges, Greenfield Township, PA (US); Desmond Walsh, Duxbury, MA (US); Christopher Kent Barmore, Arlington, MA (US)

(73) Assignee: GENTEX CORPORATION, Simpson, PA (US)

( * ) Notice: Subject to any disclaimer, the term of this patent is extended or adjusted under 35 U.S.C. 154(b) by 0 days.

(21) Appl. No.: 15/570,397

(22) PCT Filed: May 2, 2016

(86) PCT No.: PCT/US2016/030395
§ 371 (c)(1),
(2) Date: Oct. 30, 2017

(87) PCT Pub. No.: WO2016/179085
PCT Pub. Date: Nov. 10, 2016

(65) Prior Publication Data
US 2018/0140037 A1    May 24, 2018

Related U.S. Application Data

(60) Provisional application No. 62/156,004, filed on May 1, 2015.

(51) Int. Cl.
*A42B 3/12* (2006.01)
*B32B 3/12* (2006.01)
(Continued)

(52) U.S. Cl.
CPC ............ *A42B 3/124* (2013.01); *B32B 3/12* (2013.01); *B32B 3/263* (2013.01); *B32B 3/30* (2013.01);
(Continued)

(58) Field of Classification Search
CPC ......... B32B 27/065; B32B 27/06; B32B 3/12; B32B 2437/04; B32B 37/146; F41H 1/04;
(Continued)

(56) References Cited

U.S. PATENT DOCUMENTS

| 3,447,163 A * | 6/1969 | Tojeiro ............ A42B 3/065 2/412 |
| 3,829,900 A | 8/1974 | Marangoni |

(Continued)

FOREIGN PATENT DOCUMENTS

| EP | 2575521 B1 | 4/2013 |
| EP | 2822410 B1 | 1/2015 |

(Continued)

OTHER PUBLICATIONS

International Search Report for International Application No. PCT/US2016/030395, dated Oct. 19, 2016.

(Continued)

*Primary Examiner* — Khoa D Huynh
*Assistant Examiner* — Grace Huang
(74) *Attorney, Agent, or Firm* — Morgan, Lewis & Bockius LLP

(57) ABSTRACT

An impact attenuation system comprises an aluminum honeycomb sheet having a top surface and a bottom surface. The aluminum honeycomb sheet defines a plurality of approximately hexagonally shaped cells. The bottom surface defines a single sheet of contiguous cells and the top surface defines two or more islands of contiguous cells separated by one or more slits. At least a portion of one or both of the top surface (Continued)

and bottom surface may be covered by a polymer skin. The polymer skin may comprise carbon fibers and/or fiberglass.

33 Claims, 22 Drawing Sheets

(51) Int. Cl.
| | |
|---|---|
| F41H 1/04 | (2006.01) |
| F41H 5/04 | (2006.01) |
| B32B 3/30 | (2006.01) |
| B32B 3/26 | (2006.01) |
| B32B 15/20 | (2006.01) |
| B32B 37/14 | (2006.01) |
| B32B 27/34 | (2006.01) |
| B32B 37/12 | (2006.01) |
| B32B 38/00 | (2006.01) |
| B32B 15/04 | (2006.01) |
| B32B 5/22 | (2006.01) |
| B32B 15/14 | (2006.01) |
| B32B 1/00 | (2006.01) |
| B32B 5/18 | (2006.01) |
| B32B 7/12 | (2006.01) |
| B32B 15/08 | (2006.01) |
| B32B 27/06 | (2006.01) |
| B32B 27/30 | (2006.01) |
| B32B 27/36 | (2006.01) |
| B32B 27/38 | (2006.01) |
| B32B 38/18 | (2006.01) |
| B32B 38/04 | (2006.01) |

(52) U.S. Cl.
CPC ............ *B32B 15/20* (2013.01); *B32B 37/146* (2013.01); *F41H 1/04* (2013.01); *F41H 5/0457* (2013.01); *B32B 1/00* (2013.01); *B32B 5/18* (2013.01); *B32B 5/22* (2013.01); *B32B 7/12* (2013.01); *B32B 15/046* (2013.01); *B32B 15/08* (2013.01); *B32B 15/14* (2013.01); *B32B 27/065* (2013.01); *B32B 27/306* (2013.01); *B32B 27/34* (2013.01); *B32B 27/36* (2013.01); *B32B 27/38* (2013.01); *B32B 37/12* (2013.01); *B32B 38/0004* (2013.01); *B32B 38/1866* (2013.01); *B32B 2038/045* (2013.01); *B32B 2260/021* (2013.01); *B32B 2260/046* (2013.01); *B32B 2262/0253* (2013.01); *B32B 2262/0269* (2013.01); *B32B 2262/101* (2013.01); *B32B 2262/106* (2013.01); *B32B 2262/14* (2013.01); *B32B 2266/025* (2013.01); *B32B 2266/0207* (2013.01); *B32B 2266/0228* (2013.01); *B32B 2266/0235* (2013.01); *B32B 2266/0278* (2013.01); *B32B 2307/51* (2013.01); *B32B 2307/546* (2013.01); *B32B 2307/558* (2013.01); *B32B 2307/732* (2013.01); *B32B 2437/04* (2013.01); *B32B 2571/02* (2013.01)

(58) Field of Classification Search
CPC .... F41H 5/04; A42B 3/06; A42B 3/10; A42B 3/12
USPC ....... 428/72, 116, 117, 118, 131–140, 427.2; 89/36.02, 912, 923, 937; 2/414, 425
See application file for complete search history.

(56) References Cited

U.S. PATENT DOCUMENTS

| | | | | |
|---|---|---|---|---|
| 4,133,055 | A * | 1/1979 | Zebuhr | A42B 3/121 2/411 |
| 4,282,610 | A * | 8/1981 | Steigerwald | A42B 3/127 2/414 |
| 4,548,665 | A | 10/1985 | Morin | |
| 4,778,638 | A | 10/1988 | White | |
| 5,025,504 | A * | 6/1991 | Benston | A42B 3/10 2/181.4 |
| 5,310,586 | A * | 5/1994 | Mullen | B32B 3/28 428/34.1 |
| 5,349,893 | A * | 9/1994 | Dunn | F41H 5/04 2/2.5 |
| 5,524,641 | A | 6/1996 | Battaglia | |
| 5,561,866 | A | 10/1996 | Ross | |
| 5,840,397 | A * | 11/1998 | Landi | A41D 31/285 428/73 |
| 5,944,935 | A * | 8/1999 | Zukas | B29D 24/005 156/249 |
| 6,117,519 | A * | 9/2000 | Burns | B32B 3/12 428/116 |
| 6,247,186 | B1 * | 6/2001 | Huang | A42B 3/06 2/171.3 |
| 6,336,220 | B1 | 1/2002 | Sacks et al. | |
| 6,387,200 | B1 * | 5/2002 | Ashmead | B29C 44/186 156/242 |
| 7,058,989 | B2 | 6/2006 | Domingos | |
| 7,089,602 | B2 | 8/2006 | Talluri | |
| 7,189,446 | B2 * | 3/2007 | Olszewski | B82Y 10/00 250/493.1 |
| 7,254,843 | B2 | 8/2007 | Talluri | |
| 7,478,438 | B2 | 1/2009 | Lolis | |
| 7,654,260 | B2 * | 2/2010 | Ogilvie | A42B 3/281 128/201.22 |
| 7,669,378 | B2 | 3/2010 | Tsunoda et al. | |
| 8,082,599 | B2 | 12/2011 | Sajic | |
| 8,087,101 | B2 | 1/2012 | Ferguson | |
| 8,156,569 | B2 * | 4/2012 | Cripton | A42B 3/0473 2/6.8 |
| 8,510,863 | B2 | 8/2013 | Ferguson | |
| 8,640,267 | B1 * | 2/2014 | Cohen | A42B 3/063 2/411 |
| 8,898,818 | B1 | 12/2014 | Whitcomb | |
| 9,062,939 | B2 | 6/2015 | Papp | |
| 9,131,744 | B2 * | 9/2015 | Erb | A42B 3/124 |
| 9,173,445 | B1 * | 11/2015 | Whitcomb | A42B 3/124 |
| 9,186,756 | B2 * | 11/2015 | Shigetomi | B32B 3/12 |
| 9,314,060 | B2 * | 4/2016 | Giles | A42B 3/00 |
| 9,370,214 | B1 | 6/2016 | Whitcomb | |
| 9,474,318 | B2 * | 10/2016 | Wesson | A42B 3/125 |
| 9,476,478 | B2 * | 10/2016 | Staton | F16F 13/002 |
| 9,505,200 | B2 * | 11/2016 | Braden | B32B 37/146 |
| 9,572,390 | B1 * | 2/2017 | Simpson | A42B 3/125 |
| 9,572,391 | B2 * | 2/2017 | McInnis | A42B 3/064 |
| 9,573,338 | B2 * | 2/2017 | Bartolome | B32B 3/12 |
| 9,603,408 | B2 * | 3/2017 | Simpson | A42B 3/128 |
| 9,649,822 | B2 * | 5/2017 | Prud'homme | B32B 3/12 |
| 9,693,594 | B1 | 7/2017 | Castro et al. | |
| 9,709,362 | B2 * | 7/2017 | Shelley | A45F 5/02 |
| 9,717,298 | B1 * | 8/2017 | Barrett, Jr. | A42B 3/122 |
| 9,788,589 | B2 * | 10/2017 | Lewis | B32B 5/06 |
| 9,833,684 | B2 * | 12/2017 | Warmouth | A42B 3/105 |
| 9,907,346 | B2 * | 3/2018 | Hanson | A42B 3/127 |
| 10,279,559 | B2 * | 5/2019 | Miyairi | B32B 3/12 |
| 10,279,573 | B2 * | 5/2019 | Ishii | B32B 37/06 |
| 10,350,477 | B2 * | 7/2019 | Schneider | A42B 3/065 |
| 10,517,347 | B2 * | 12/2019 | Suddaby | A42B 3/064 |
| 10,555,566 | B2 * | 2/2020 | Foster | A41D 13/015 |
| 10,736,373 | B2 * | 8/2020 | Chilson | A42B 3/127 |
| 2004/0026436 | A1 | 2/2004 | Ely | |
| 2005/0025929 | A1 * | 2/2005 | Smith | B32B 7/12 428/73 |
| 2006/0059605 | A1 | 3/2006 | Ferrara | |
| 2006/0059606 | A1 | 3/2006 | Ferrara | |
| 2007/0220662 | A1 | 9/2007 | Pierce | |

(56) References Cited

U.S. PATENT DOCUMENTS

| | | |
|---|---|---|
| 2008/0113143 A1 | 5/2008 | Taylor |
| 2008/0155735 A1 | 7/2008 | Ferrara |
| 2010/0258988 A1* | 10/2010 | Darnell ................. A42B 3/064 267/141 |
| 2010/0282062 A1 | 11/2010 | Sane et al. |
| 2011/0167542 A1* | 7/2011 | Bayne ...................... A42B 3/14 2/416 |
| 2011/0189440 A1* | 8/2011 | Appleby ............... B29C 33/301 428/156 |
| 2011/0203024 A1 | 8/2011 | Morgan |
| 2013/0180034 A1 | 7/2013 | Preisler |
| 2013/0291289 A1* | 11/2013 | Szalkowski .............. A42B 3/12 2/414 |
| 2013/0298316 A1 | 11/2013 | Jacob |
| 2013/0305435 A1 | 11/2013 | Surabhi |
| 2014/0013492 A1* | 1/2014 | Bottlang ................ A42B 3/125 2/414 |
| 2014/0020158 A1* | 1/2014 | Parsons ................. A42B 3/122 2/413 |
| 2014/0373257 A1 | 12/2014 | Turner et al. |
| 2015/0033453 A1 | 2/2015 | Pannikottu et al. |
| 2015/0040296 A1 | 2/2015 | Hanson et al. |
| 2015/0047110 A1* | 2/2015 | Chilson .................... A42B 3/28 2/414 |
| 2015/0121609 A1 | 5/2015 | Cote |
| 2015/0272258 A1 | 10/2015 | Preisler |
| 2015/0305430 A1 | 10/2015 | Rush et al. |
| 2016/0095375 A1 | 4/2016 | Ho |
| 2016/0255900 A1* | 9/2016 | Browd ................... A42B 3/064 |
| 2016/0271482 A1 | 9/2016 | Garland et al. |
| 2016/0278470 A1 | 9/2016 | Posner et al. |
| 2016/0286886 A1 | 10/2016 | Lytle |
| 2016/0302507 A1 | 10/2016 | Lewis et al. |
| 2016/0303819 A1* | 10/2016 | Iseli ...................... B31D 3/007 |
| 2016/0317871 A1 | 11/2016 | Burns et al. |
| 2016/0353825 A1 | 12/2016 | Bottlang et al. |
| 2017/0042272 A1* | 2/2017 | Ferguson ............... A42B 3/121 |
| 2017/0188650 A1 | 7/2017 | Hector, Jr. et al. |
| 2017/0203190 A1 | 7/2017 | Turner et al. |
| 2019/0059498 A1* | 2/2019 | Kovarik .................. A42B 3/20 |

FOREIGN PATENT DOCUMENTS

| | | | |
|---|---|---|---|
| GB | 1049528 A | 11/1966 | |
| JP | 3107477 B2 | 11/2000 | |
| JP | 3839463 B1 * | 11/2006 | ............ A42B 3/286 |
| WO | 2013026077 A1 | 2/2013 | |
| WO | 2015069800 A2 | 5/2015 | |
| WO | 2015084709 A1 | 6/2015 | |
| WO | 2015103283 A1 | 7/2015 | |
| WO | 2016/123123 A1 | 8/2016 | |
| WO | 2016154364 A1 | 9/2016 | |
| WO | 2016195974 A1 | 12/2016 | |
| WO | 2017062945 A1 | 4/2017 | |
| WO | 2017123829 A1 | 7/2017 | |

OTHER PUBLICATIONS

Written Opinion of the International Searching Authority for International Application No. PCT/US2016/030395, dated Oct. 19, 2016.
Search Report dated Nov. 27, 2018 for European Patent Application No. 16789884.0, 9 pages.

* cited by examiner

HELMET IMPACT ATTENUATION ARTICLE

CROSS-REFERENCE TO RELATED APPLICATIONS

This application is a U.S. National Stage filing of International Application No. PCT/US2016/030395, filed May 2, 2016, entitled "Helmet Impact Attenuation Article," which claims the benefit of U.S. Provisional Patent Application No. 62/156,004, filed May 1, 2015, entitled "Helmet Impact Attenuation Article," each of which is hereby incorporated by reference in its entirety.

FIELD OF THE INVENTION

The present invention generally relates to impact attenuation articles for helmet systems and, more particularly, to liners for helmet systems for impact attenuation.

BACKGROUND OF THE INVENTION

Helmet manufacturers have long dealt with the competing requirements of increased performance requirements, lower weight targets, and thinner shells. The current state of the art, expanded poly-styrene (EPS) is light and inexpensive, however it increases the size of the helmet due to the thickness of EPS needed in order to attain the required performance. Further EPS is best when sustaining a single impact; a second impact shows lesser protection. Accordingly, there is a need for a lightweight impact attenuation article that provides protection over multiple impacts.

BRIEF SUMMARY OF THE INVENTION

An impact liner system for a helmet includes an impact attenuation article comprising an aluminum honeycomb sheet having a top surface and a bottom surface, the aluminum honeycomb sheet defining a plurality of approximately hexagonally shaped cells, wherein the bottom surface defines a single sheet of contiguous cells and the top surface defines two or more islands of contiguous cells separated by one or more slits. In some embodiments the aluminum honeycomb has been crushed, sanded, and/or cut from an initial thickness to a predetermined thickness. In some embodiments the impact attenuation article includes a plurality of aluminum honeycomb sheets. The plurality of aluminum honeycomb sheets may provide different levels of impact attenuation at different locations of the impact liner system.

In some embodiments the two or more islands of an impact attenuation article of an impact liner system are approximately rectangular in shape. In some embodiments the two or more islands of an impact attenuation article of an impact liner system are approximately 2 cm wide by 2 cm long. In some embodiments the aluminum honeycomb sheet further has a bottom portion that extends from the bottom surface to the one or more slits, wherein the bottom portion is approximately 0.16 cm thick in a vertical direction. The top surface of the aluminum honeycomb sheet may have a convex curvature and the bottom surface has a concave curvature; alternatively, the top surface may have a concave curvature and the bottom surface has a convex curvature.

In some embodiments a polymer skin may cover at least a portion of one of the top surface and bottom surface of the aluminum honeycomb sheet. In some embodiments a second polymer skin may cover at least a portion of the other of the top surface and the bottom surface of the aluminum honeycomb sheet. The polymer skin may include a carbon fiber reinforced polymer and/or fiberglass. In some embodiments an adhesive may cover at least a portion of one of the top surface and bottom surface of the aluminum honeycomb sheet. The adhesive may include a plurality of hooks or loops.

The impact liner system may further include a second impact attenuation article that includes an aluminum honeycomb sheet having a top surface and a bottom surface, the aluminum honeycomb sheet defining a plurality of approximately hexagonally shaped cells, wherein the bottom surface defines a single sheet of contiguous cells and the top surface defines two or more islands of contiguous cells separated by one or more slits; wherein the second impact attenuation article is configured to be disposed over an external surface of the helmet.

In some embodiments the aluminum honeycomb of the second impact attenuation article has been crushed, sanded, and/or cut from an initial thickness to a predetermined thickness. In some embodiments the second impact attenuation article includes a plurality of aluminum honeycomb sheets. The plurality of aluminum honeycomb sheets of the second impact attenuation article may provide different levels of impact attenuation at different locations of the impact liner system.

In some embodiments the two or more islands of the second impact attenuation article of an impact liner system are approximately rectangular in shape. In some embodiments the two or more islands of the second impact attenuation article of an impact liner system are approximately 2 cm wide by 2 cm long. In some embodiments the aluminum honeycomb sheet of the second impact attenuation article further has a bottom portion that extends from the bottom surface to the one or more slits, wherein the bottom portion is approximately 0.16 cm thick in a vertical direction. The top surface of the aluminum honeycomb sheet of the second impact attenuation article may have a convex curvature and the bottom surface has a concave curvature; alternatively, the top surface may have a concave curvature and the bottom surface has a convex curvature.

In some embodiments a polymer skin may cover at least a portion of one of the top surface and bottom surface of the aluminum honeycomb sheet of the second impact attenuation article. In some embodiments a second polymer skin may cover at least a portion of the other of the top surface and the bottom surface of the aluminum honeycomb sheet of the second impact attenuation article. The polymer skin may include a carbon fiber reinforced polymer and/or fiberglass. In some embodiments an adhesive may cover at least a portion of one of the top surface and bottom surface of the aluminum honeycomb sheet of the second impact attenuation article. The adhesive may include a plurality of hooks or loops.

An impact liner system may further include a liner body sized and configured to fit within an interior of the helmet and around a portion of a wearer's head, the liner body comprising an impact-absorbing material and having an outer surface with a convex curvature and an interior surface with a concave curvature; wherein the liner body defines a hole extending from the outer surface to the inner surface. In some embodiments, the impact attenuation article is disposed in the hole such that the top surface is generally aligned with the outer surface of the liner body and the bottom surface is generally aligned with the interior surface of the liner body.

A method of manufacturing an impact liner system for a helmet comprising an impact attenuation article, the impact attenuation article comprising an aluminum honeycomb sheet having a top surface and a bottom surface and a thickness measured between the top surface and bottom surface is disclosed. The method may include reducing at least a portion of the thickness of the aluminum honeycomb sheet from an initial height to a predetermined second height; cutting the aluminum honeycomb sheet in a direction orthogonal to the top and bottom surface to form a slit that extends from the top surface towards the bottom surface; and pressing the aluminum honeycomb sheet in a mold to provide a shaped aluminum honeycomb sheet. Reducing a thickness of the aluminum honeycomb sheet may include cutting, sanding, and/or crushing the aluminum honeycomb sheet. In some embodiments the method includes coupling a polymer skin to at least a portion of one of the top surface and bottom surface of the aluminum honeycomb sheet. In some embodiments the method includes coupling a polymer skin to at least a portion of both of the top surface and bottom surface of the aluminum honeycomb sheet. The polymer skin may include carbon fiber reinforced polymer and/or fiberglass.

BRIEF DESCRIPTION OF THE SEVERAL VIEWS OF THE DRAWINGS

The following detailed description of embodiments of the helmet impact attenuation article will be better understood when read in conjunction with the appended drawings of exemplary embodiments. It should be understood, however, that the invention is not limited to the precise arrangements and instrumentalities shown.

In the drawings.

DETAILED DESCRIPTION OF THE INVENTION

Figure 1:
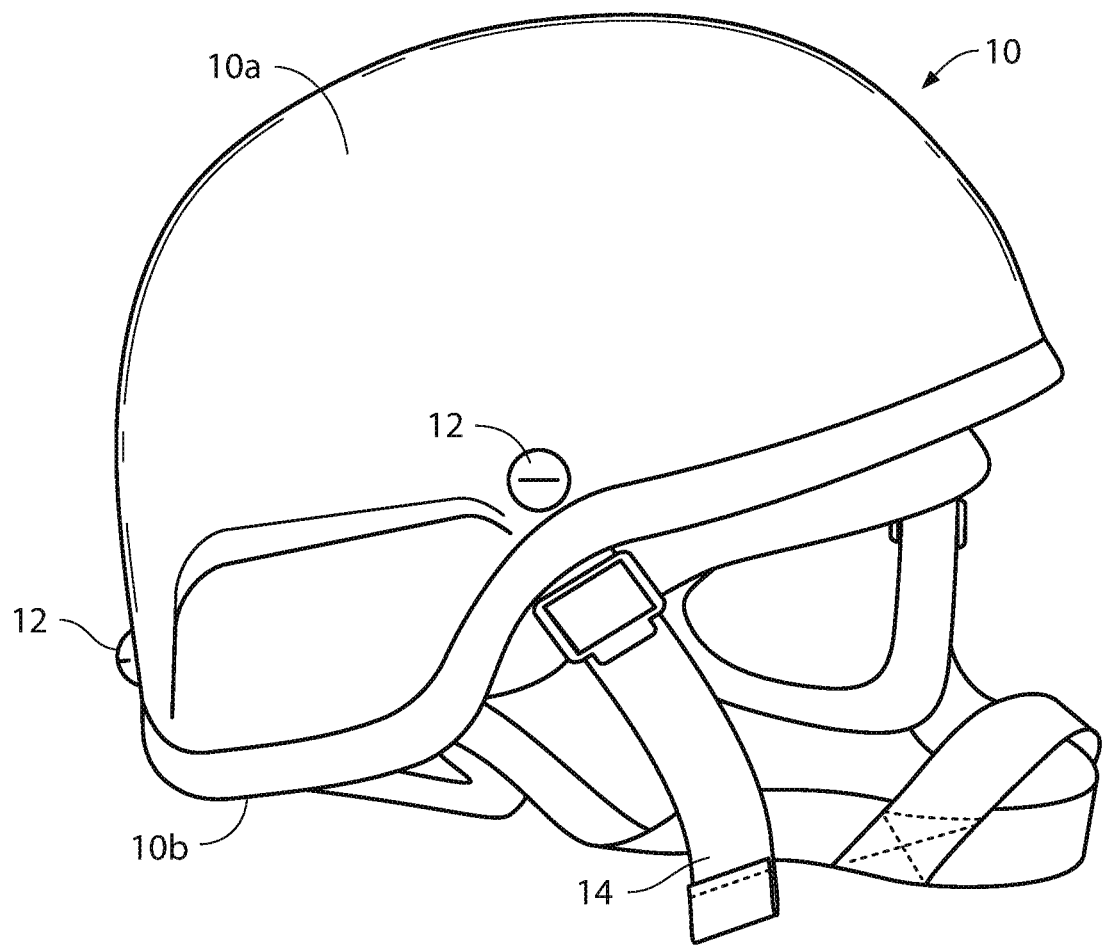
FIG. 1 is a perspective view of a prior art helmet.

Referring to FIG. 1, an exemplary helmet 10 may comprise a rigid helmet shell 10a and an impact liner 10b is designed to protect a user's head from impact with an object or surface. The helmet 10 may be positioned on a wearer's head and secured by a retention system 14. A retention system 14 such as a chin strap may be mounted to the helmet by fasteners 12.

Referring to the drawings in detail, wherein like reference numerals indicate like elements throughout, there is shown an impact liner system, generally designated 100, in accordance with an exemplary embodiment of the present invention. The impact liner system 100 may be used in place of or in addition to an impact liner to improve the impact attenuation of a helmet. In some embodiments, the impact liner system 100 at least partially crushes to absorb a force exerted to the helmet to prevent or reduce injury to the person wearing the helmet.

Figure 10A:
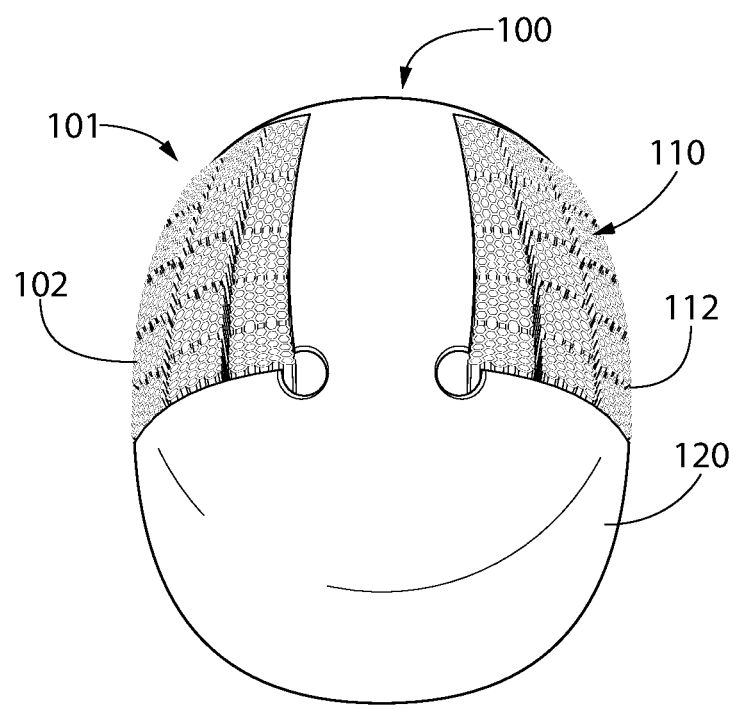
FIG. 10A is a top (exterior) perspective view of a plurality of impact attenuation articles inserted into a helmet liner body in a side-to-side configuration, in accordance with an embodiment of the invention.
Figure 16:
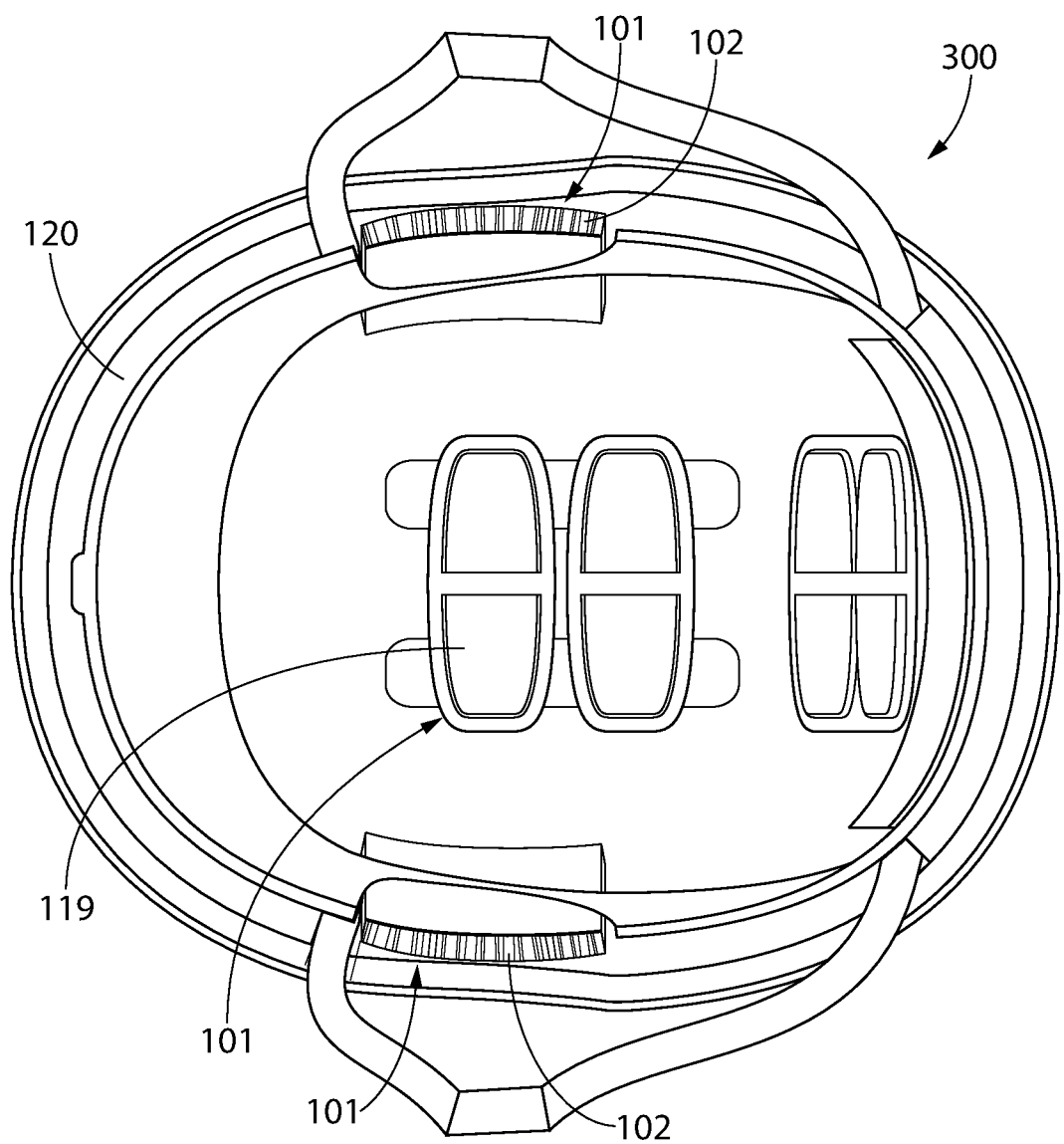
FIG. 16 is a bottom plan view of impact attenuation articles comprising pre-crushed aluminum honeycomb/carbon fiber reinforced polymer pads inserted in a ground helmet, according to an embodiment of the invention.

Referring to FIG. 10A, in certain preferred embodiments of the present invention, the impact liner system 100 includes a liner body 120 and an impact attenuation article 101. In some embodiments, liner body 120 may comprise or consist essentially of an impact attenuation article 101. In some embodiments, liner body 120 is configured to be positioned within an interior region of a head protection device, such as a helmet 300 (FIG. 16). More particularly, liner 120 in some embodiments is configured to be positioned between helmet 300 and a wearer's head during use and provide impact protection to the wearer. In preferred embodiments, liner body 120 may be removably attached to helmet 300 during use. In some embodiments an impact attenuation article 101 may be removably attached to helmet 300 during use. Impact attenuation article 101 may be removably attached to the exterior surface of helmet 300, or the interior surface of helmet 300. In some embodiments, an impact attenuation article 101 is utilized as an impact attenuator for use in an aircrew soldier helmet system and/or a ground soldier helmet system.

Referring to FIG. 16, helmet 300 may be any type of head protection helmet known in the art, for example, those used for sporting, police, or military purposes. In certain embodiments, helmet 300 is a standard infantry ballistic helmet. In some embodiments, helmet 300 is an advanced combat helmet ("ACH"), a modular integrated communications helmet ("MICH"), a tactical ballistic helmet ("TBH"), a lightweight marine helmet, police general duty helmet, a personnel armor system for ground troops ("PASGT"), or an aircrew helmet, such as an HGU-56/P rotary wing helmet or an HGU 55/P fixed wing helmet.

The impact attenuation article 101 can define any shape to provide the desired impact attenuation. For example, in some embodiments an impact attenuation article 101 can define a shape to fit snugly within an opening, hole, or recess in a conventional helmet liner. In some embodiments an impact attenuation article 101 may be sized and shaped to cover all or substantially all of the inner surface of a helmet and may serve as a liner body 120. In other embodiments an impact attenuation article 101 may be sized and shaped to serve as impact attenuation pads, either when placed on the inside surface of a liner body 120 or helmet 300 or when placed on the exterior surface of a helmet 300. Accordingly, an impact attenuation article 101 may have any size or dimension as would be useful for the intended purpose. For example, in some embodiments the impact attenuation article 101 is sized and dimensioned to fit within an opening or recess in a conventional helmet liner. In some embodiments the impact attenuation article 101 has a thickness in a range from about 10 mm to about 20 mm, from about 12 mm to about 18 mm, or from about 14 mm to about 16 mm. In some embodiments the impact attenuation article 101 is at least 10 mm thick, at least 12 mm thick, at least 14 mm thick, at least 16 mm thick, or at least 20 mm thick. In some embodiments the impact attenuation article 101 has a thickness less than 20 mm.

In some embodiments the impact attenuation article 101 may be generally rectangular or generally square in shape. In other embodiments impact attenuation article 101 may have rounded sides or be generally oval. In still other embodiments the impact attenuation article 101 may have the general shape of a rhombus. In some embodiments the impact attenuation article 101 may have a width of less than 6 inches, less than 5 inches, less than 4 inches, less than 3 inches, between about 1 inches and about 15 inches, between about 2 inches and about 10 inches, between about 3 inches and about 6 inches, about 2 inches, about 3 inches, about 4 inches, about 5 inches, or about 6 inches.

In some embodiments the impact attenuation article 101 may have a length of less than 6 inches, less than 5 inches, less than 4 inches, less than 3 inches, between about 1 inches and about 15 inches, between about 2 inches and about 10 inches, between about 3 inches and about 6 inches, about 2 inches, about 3 inches, about 4 inches, about 5 inches, or about 6 inches. In a preferred embodiment, an impact attenuation article 101 is about 4 inches wide by about 4 inches long.

In some embodiments the impact attenuation article 101 has a thickness in a range from about 5 mm to about 50 mm, about 5 mm to about 40 mm, about 5 mm to about 30 mm, about 5 mm to about 20 mm, about 5 mm to about 10 mm, about 10 mm to about 20 mm, about 10 mm to about 30 mm, about 10 mm to about 40 mm, about 10 mm to about 50 mm, from about 12 mm to about 18 mm, or from about 14 mm to about 16 mm. In some embodiments the impact attenuation article 101 is at least 10 mm thick, at least 12 mm thick, at least 14 mm thick, at least 16 mm thick, at least 20 mm thick, at least 25 mm thick, or at least 30 mm thick. In some embodiments the impact attenuation article 101 has a thickness less than 20 mm. In some embodiments the impact attenuation article 101 has a thickness in a range of about 1/16 inch to about 2 inches, about 1/16 inch to about 1 inch, about 1/16 inch to about 3/4 inch, about 1/8 inch to about 3/4 inch, about 1/4 inch to about 1 inch, about 1/4 inch to about 3/4 inch, or about 1/2 inch to about 1 1/2 inches.

In some embodiments, impact attenuation article 101 comprises a pre-crushed aluminum honeycomb ("PCAH") sheet 102. Pre-crushed aluminum honeycomb as used herein refers to an aluminum honeycomb material that has been treated with a controlled impact (i.e. pre-crushed), or otherwise has had a portion or the entirety of the aluminum honeycomb sheet reduced in thickness from an original height to a predetermined second height such as by cutting or sanding. PCAH is a lightweight material that may meet standardized impact requirements while potentially maintaining performance through multiple impact test hits. The combination of material, geometry and use may allow the PCAH useful for impact attenuation in helmets.

Figure 2A:
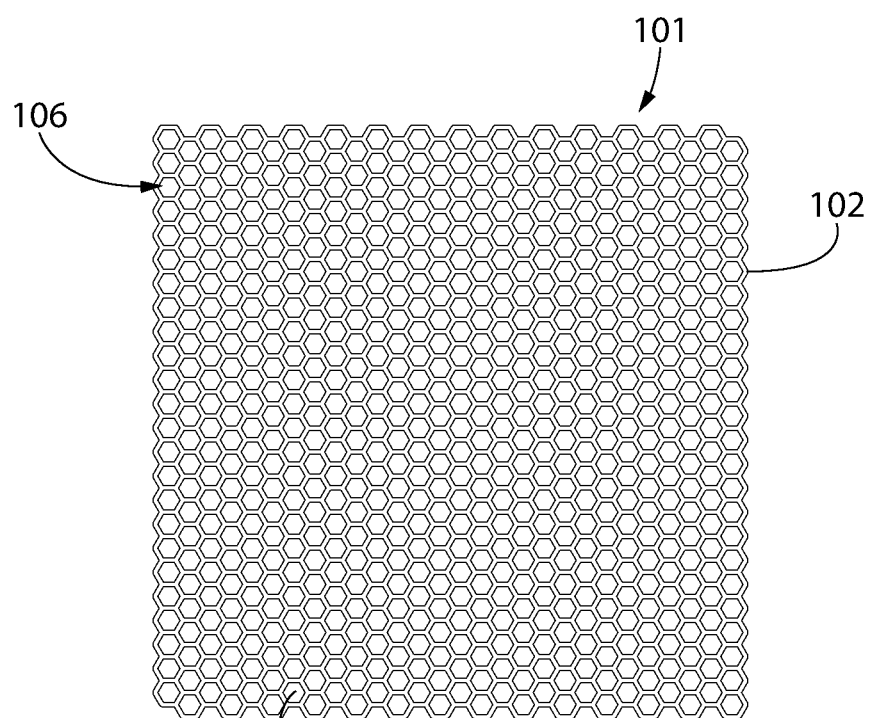
FIG. 2A is a bottom plan view of an impact attenuation article according to an embodiment of the invention.
Figure 2B:
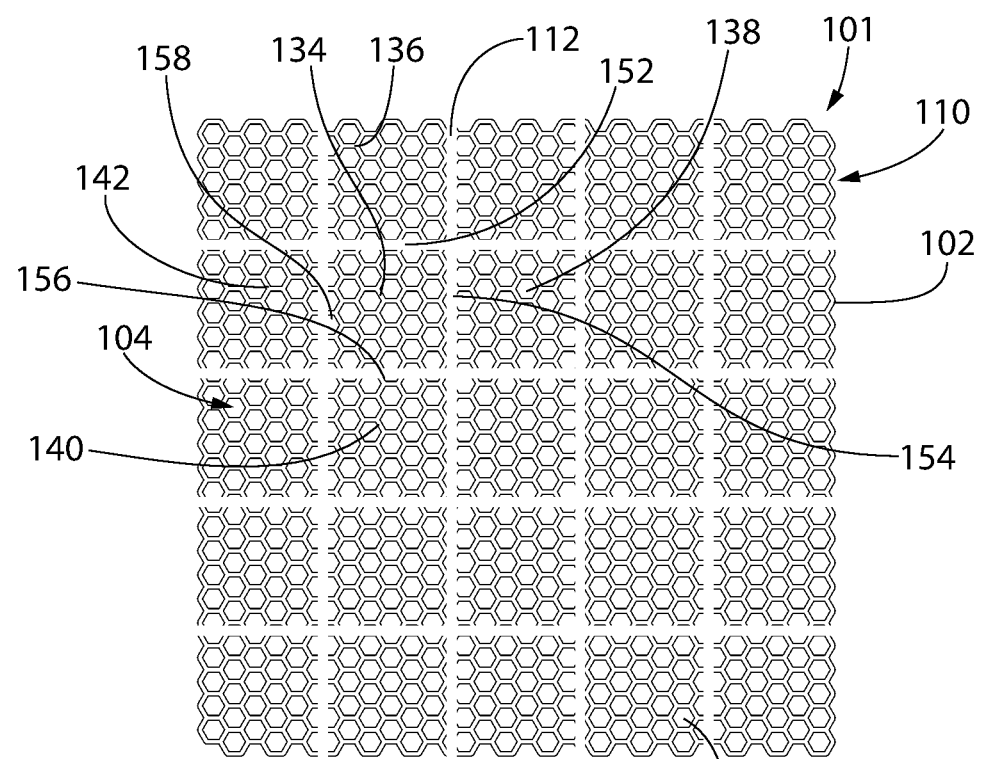
FIG. 2B is a top plan view of the impact attenuation article of FIG. 2A after the precrushed aluminum honeycomb sheet has been slit or cut in accordance with an embodiment of the invention.

Referring to FIGS. 2A and 2B, an impact attenuation article 101 may include a pre-crushed aluminum honeycomb ("PCAH") sheet 102 having a top surface 104 and a bottom surface 106, the pre-crushed aluminum honeycomb sheet 102 defining a plurality of cells 108 (e.g. approximately hexagonally shaped cells), wherein the bottom surface 106 defines a single sheet of contiguous cells and the top surface 104 defines two or more islands 110 of contiguous cells separated by one or more slits 112. In some embodiments, the bottom surface 106 defines a single sheet of contiguous cells and the top surface 104 defines a first island 134 of contiguous cells having a first side, a second side, a third side, and a fourth side, the first side being separated from a second island 136 of contiguous cells by a first slit 152, the second side being separated from a third island 138 of contiguous cells by a second slit 154, the third side being separated from a fourth island 140 of contiguous cells by a third slit 156, and the fourth side being separated from a fifth island 142 of contiguous cells by a fourth slit 158, the first slit 152 intersecting the second slit 154 and the fourth slit 158, the second slit 154 intersecting the third slit 156, and the third slit 156 intersecting the fourth slit 158. The impact attenuation article 101 has a thickness (depth) as measured along a vertical axis extending through top surface 104 and bottom surface 106 and perpendicular to top surface 104, and a length and width each measured along an axis extending in the plane of top surface 104.

Although the pre-crushed aluminum honeycomb sheet 102 may ordinarily comprise or consist essentially of aluminum, in some embodiments, the pre-crushed aluminum honeycomb sheet 102 comprises other metals, alloys or one or more composites. Also, although in some embodiments, the pre-crushed aluminum honeycomb sheet 102 includes generally hollow cells 108 each having a hexagonally shaped cross section with a generally constant size along its length, the cells may, in some embodiments, have a different cross sectional shapes such as triangular, circular, rectangular, pentagonal, hexagonal, or other shape such as a polygonal shape. Preferably, cells 108 are approximately hexagonally shaped.

Figure 5:
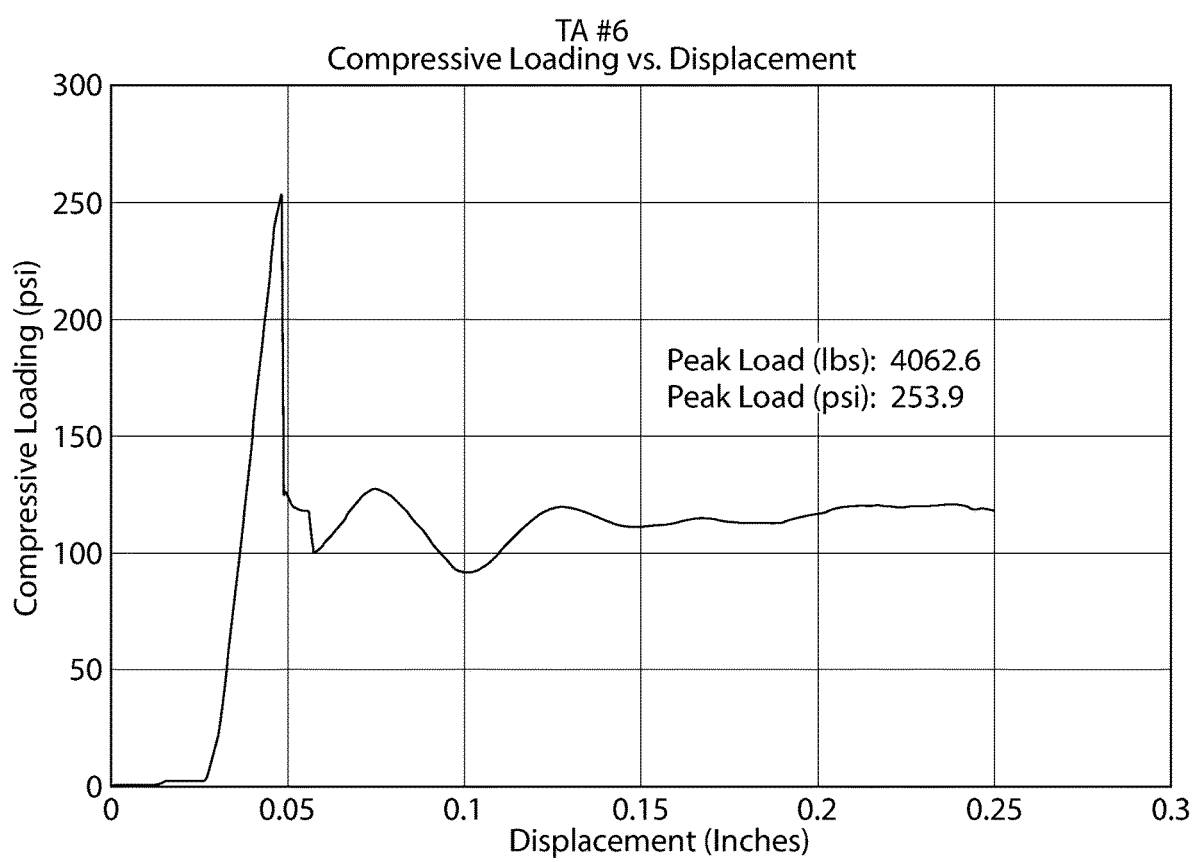
FIG. 5 is a stress-strain curve showing the removal of the peak and following range of uniform stress by pre-crushing a honeycomb sheet, pre-crushed in accordance with an embodiment of the invention.

In some embodiments a method of preparing an impact attenuation article 101 includes providing a traditional uncrushed core and introducing the pre-crush. In some embodiments a large hydraulic press may be used to introduce a pre-crush. In some embodiments cutting or sanding may be used to introduce a pre-crush. Pre-crushing a honeycomb core may provide a lower pressure or crush strength. Honeycomb manufacturers define the product in terms of crush strength in units of pounds per square inch (psi). FIG. 5 shows this crush strength as Compressive Loading in psi. Consider a test helmet configured as described above, impacting a flat anvil. If the honeycomb has too low crush strength, it will be completely crushed on impact and the maximum permitted acceleration is likely to be exceeded. As stronger honeycomb is tested, eventually the acceleration readings will decrease below the maximum permitted. One optimized situation would be to have the honeycomb almost totally crushed. As stronger and stronger honeycomb is tested, the acceleration readings will increase and progressively less crushing of the honeycomb will take place. When a too strong honeycomb is tested, the acceleration will again exceed the permitted limit because practically no crushing will have occurred.

In some embodiments a pre-crushed aluminum honeycomb sheet 102 has a crush strength of about 100 psi, about 120 psi, about 140 psi, about 160 psi, about 180 psi, about 200 psi, about 205 psi, about 210 psi, about 215 psi, about 220 psi, about 225 psi, about 230 psi, about 240 psi, about 245 psi, about 250 psi, about 260 psi, about 270 psi, about 280 psi, about 300 psi, about 320 psi, about 340 psi, about 350 psi, about 375 psi, about 400 psi, about 425 psi, about 450 psi, about 475 psi, or about 500 psi. In some embodiments a pre-crushed aluminum honeycomb sheet 102 has a crush strength in a range of about 100 psi to about 500 psi, about 100 psi to about 300 psi, about 150 psi to about 250 psi, about 200 psi to about 300 psi, about 200 psi to about 250 psi, about 250 psi to about 300 psi, about 225 psi to about 275 psi, or about 200 psi to about 400 psi.

A honeycomb core may be pre-crushed in a vertical axial direction such that peak load forces caused by an initial fall are eliminated and the core is crushed at a substantially uniform level. Before the core begins to crush there is a substantial peak stress. Referring to FIG. 5, the 'peak' stress has been eliminated after only $\frac{1}{16}$ in of crush (e.g. a crush of $\frac{1}{16}$ inch in a vertical direction). Once crush occurs, the core maintains a near uniform stress as the strain increases. The constant stress section is approximately half the stress of the peak. It is this continuous plastic deformation by the honeycomb that makes PCAH desirable as an impact energy absorber. As long as there is more honeycomb to crush, the PCAH will continue to absorb impact energy at the same rate.

Figure 6A:
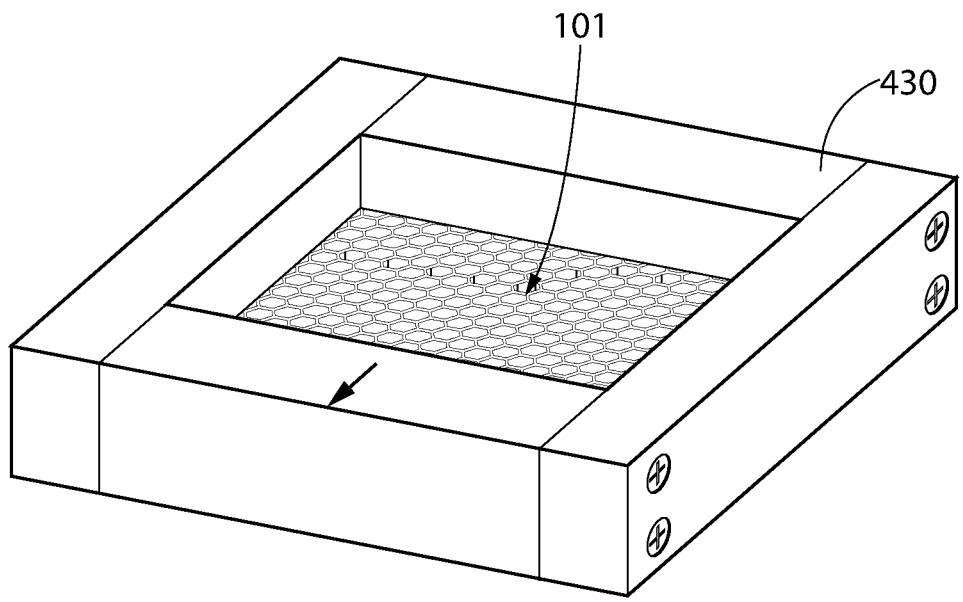
FIG. 6A is a perspective view of a pre-crushed honeycomb test article in a window frame fixture, in accordance with an embodiment of the invention.
Figure 6B:
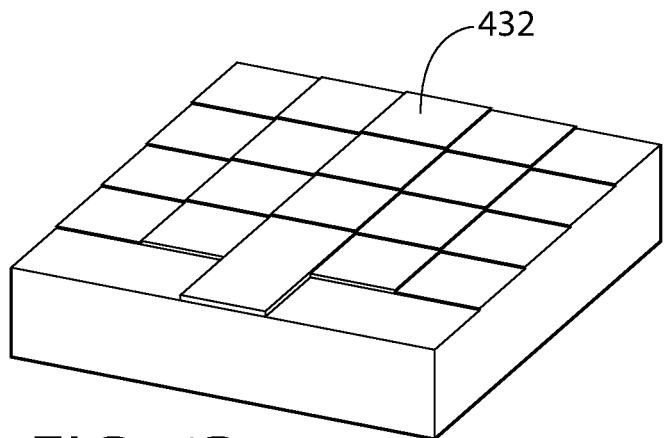
FIG. 6B is a perspective view of a map for pre-crushing a honeycomb sheet, in accordance with an embodiment of the invention.
Figure 6C:
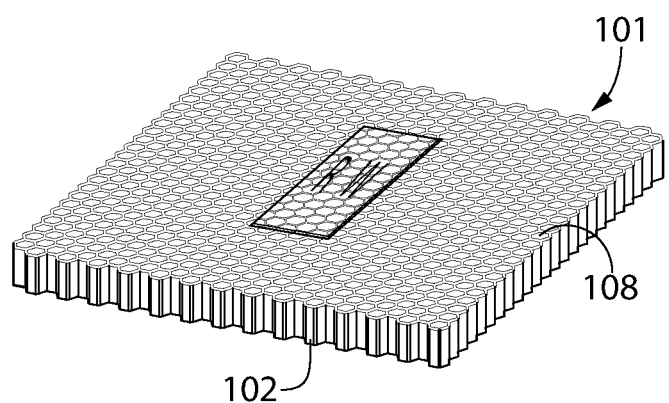
FIG. 6C is a honeycomb sheet to be pre-crushed according to the map shown in FIG. 6B sheet.
Figure 6D:
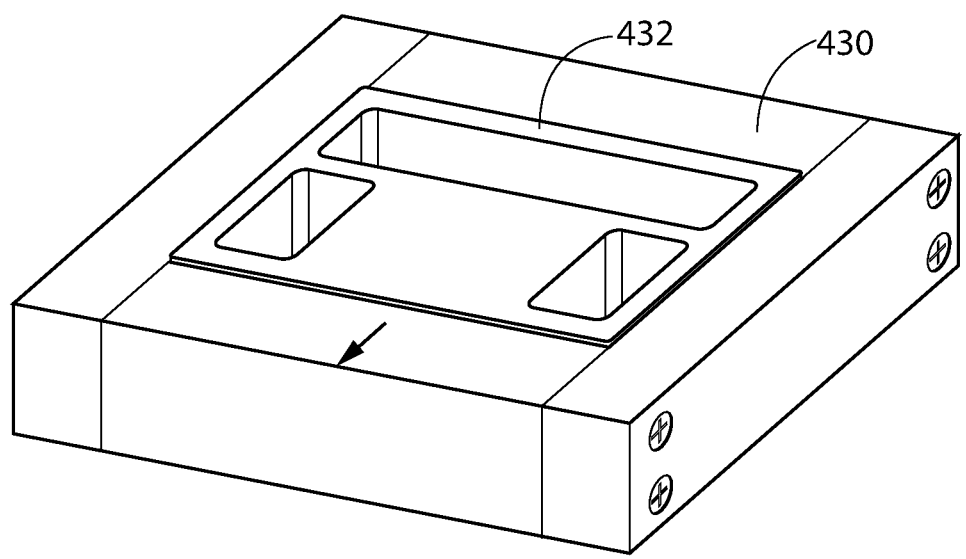
FIG. 6D is a perspective view of the map of FIG. 6B disposed within the window frame fixture of FIG. 6A and ready for crushing, in accordance with an embodiment of the invention.

In some embodiments, the pre-crushing is done in two steps. In some embodiments an initial pre-crush is provided to all, substantially all, or a portion of the un-crushed aluminum honeycomb sheet. A second pre-crush may then be applied to all, or more preferably substantially all or a portion of the aluminum honeycomb sheet. The second pre-crush may comprise pressing a 3D map 432 (FIG. 6B) into the pre-crushed aluminum honeycomb sheet 102. 3D map 432 may have different heights or different degrees of hardness in different locations to cause the pre-crushed aluminum honeycomb sheet 102 to crush to varying degrees in different locations. For example, to obtain a final pre-crushed aluminum honeycomb test article (pre-crushed and with the mapped thickness) to be less than $\frac{15}{16}$ inches thick, the whole un-crushed aluminum honeycomb sheet would first be cut (e.g. by sanding) to a thickness representing the highest location in the map plus the amount (e.g. $\frac{1}{16}$ inch) that will be lost during the first pre-crushing step. After the first pre-crushing step is complete, the sheet may be cut to the desired area (e.g. 4 inches by 4 inches) and then slitted into smaller shapes (e.g. islands 110) on the Dremel saw, for example. The second pre-crushing step takes place when the map 432 is impressed on the pre-crushed test article. The highest point on the map receives no additional crushing.

It has been found that reducing the honeycomb thickness to a desired dimension (e.g., by cutting, sanding) surprisingly creates a surface that will reliably be the pre-crushed side of the honeycomb. It has also been found that pre-crushing can be done in only a quarter of that recommended by the honeycomb supplier. It has been found that pre-crushing an uncrushed aluminum honeycomb material as received from a commercial supplier (e.g. a 1 inch uncrushed aluminum honeycomb material without pre-cutting/sanding) results in variation as to which side (i.e. top or bottom) of the sheet is crushed. Cutting (e.g. sanding) the thickness to a desired dimension before performing the pre-crush surprisingly results in only the cut side (and not the untouched store bought side), accepting all of the pre-crushing. Without being bound by theory, it may be that the process of cutting (e.g. sanding) the aluminum honeycomb material weakens the cut/sanded side such that it crushes in response to an external force before the uncut/unsanded side. FIG. 5 demonstrates that the same "flat" stress-strain curve after pre-crushing can be achieved using this method.

In some embodiments a thickness of the honeycomb core may be pre-crushed a certain percentage of the original thickness, such as about 0.001%, 0.005%, 0.01%, 0.05%, 0.1%, 0.5%, 1%, 2%, 5%, 7%, 10%, 15%, 20%, 15%, 25%, 30%, 35%, 40%, 45%, 50%, 55%, 60%, 65%, 70%, 75%, 80%, 85%, 90%, between 1% and 95%, between 1% and 75%, between 1% and 50%, between 1% and 30%, between 1% and 25%, between 1% and 10%, between 0.01% and 10%, between 1% and 5%, between 0.01% and 5%, between 0.01% and 2%, between 0.01% and 1%, between 0.1% and 5%, between 0.1% and 2%, between 0.01% and 1%, or less than 99%, less than 95%, less than 90%, less than 85%, less than 80%, less than 75%, less than 70%, less than 65%, less than 60%, less than 55%, less than 50%, less than 45%, less than 40%, less than 35%, less than 30%, less than 25%, less than 20%, less than 15%, less than 10%, less than 5%, less than 2%, less than 1%, or less than 0.1%. In some embodiments a honeycomb core may be pre-crushed by less than $\frac{1}{12}$ inch. In some embodiments a honeycomb core may be pre-crushed by less than $\frac{1}{16}$ inch. In some embodiments a honeycomb core may be pre-crushed by less than $\frac{1}{20}$ inch.

In some embodiments the pre-crushed aluminum honeycomb sheet 102 has a thickness in a range from about 5 mm to about 50 mm, about 5 mm to about 40 mm, about 5 mm to about 30 mm, about 5 mm to about 20 mm, about 5 mm to about 10 mm, about 10 mm to about 20 mm, about 10 mm to about 30 mm, about 10 mm to about 40 mm, about 10 mm to about 50 mm, from about 12 mm to about 18 mm, or from about 14 mm to about 16 mm. In some embodiments the pre-crushed aluminum honeycomb sheet 102 is at least 10 mm thick, at least 12 mm thick, at least 14 mm thick, at least 16 mm thick, at least 20 mm thick, at least 25 mm thick, or at least 30 mm thick. In some embodiments the aluminum honeycomb sheet 102 has a thickness less than 20 mm. In some embodiments the pre-crushed aluminum honeycomb sheet 102 has a thickness in a range of about $\frac{1}{16}$ inch to about 2 inches, about $\frac{1}{16}$ inch to about 1 inch, about $\frac{1}{16}$ inch to about $\frac{3}{4}$ inch, about $\frac{1}{8}$ inch to about $\frac{3}{4}$ inch, about $\frac{1}{4}$ inch to about 1 inch, about $\frac{1}{4}$ inch to about $\frac{3}{4}$ inch, or about $\frac{1}{2}$ inch to about 1½ inches.

While in preferred embodiments impact attenuation article 101 comprises a pre-crushed aluminum honeycomb sheet 102, an impact attenuation article 101 comprising an uncrushed aluminum honeycomb core is also within the scope of the invention and it is to be understood that in an alternative embodiment an uncrushed aluminum honeycomb sheet is used in an impact attenuation article 101 in place of a pre-crushed aluminum honeycomb sheet and is within the scope of the invention disclosed herein. In some embodiments a portion of aluminum honeycomb sheet is pre-crushed and a portion is uncrushed. In other embodiments all or substantially all of aluminum honeycomb sheet is uncrushed. In cases where having a peak in crush strength is a desirable attribute, pre-crushing might not be performed to at least a portion of an aluminum honeycomb sheet. In some embodiments, pre-crushed aluminum honeycomb sheet 102 is configured to provide different levels of crush strength and/or impact attenuation at different portions of the article. In some embodiments, different levels of crush strength and/or impact attenuation can be achieved by having pre-crushed aluminum honeycomb sheet 102 with different degrees or depths of pre-crush at the different locations.

Figure 3:
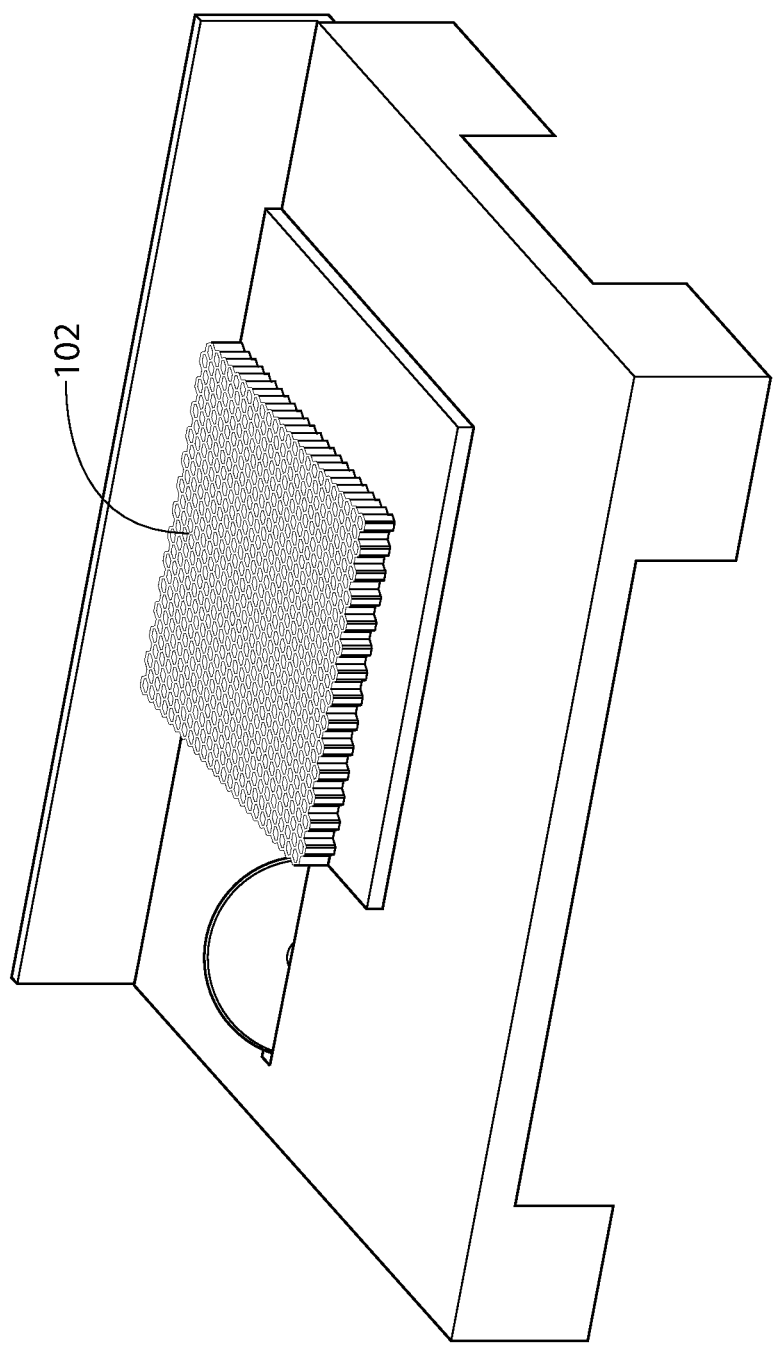
FIG. 3 is a perspective view of a table top fixture holding a cutting tool for slitting aluminum honeycomb, as shown in FIG. 2B.
Figure 4:
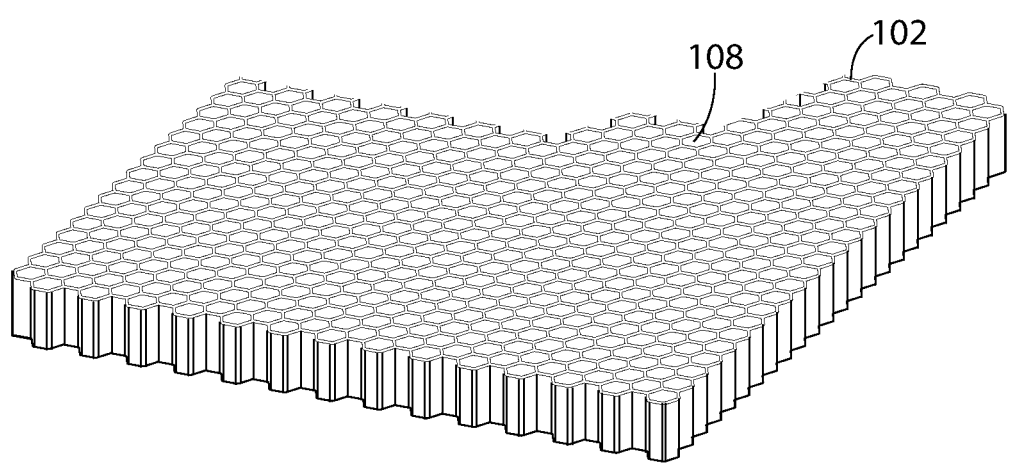
FIG. 4 is a perspective view of a bare honeycomb sheet cut to a desired thickness in accordance with an embodiment of the invention.

Traditionally, aluminum honeycomb core is generally used in flat sheet form. Helmet 300 is typically composed of compound surfaces, making the use of traditional honeycomb core for impact attenuation difficult. In order to allow the pre-crushed aluminum honeycomb core ("PCAH") to conform to a compound shape, a system is disclosed where the flat honeycomb is divided into smaller shapes 110 by one or more cuts (e.g. slits) 112, as shown in FIG. 2B. The depth of the cut or slit 112 is such that the entire piece—e.g. pre-crushed aluminum honeycomb sheet 102 and/or impact attenuation article 101—remains partially intact but can assume a curved, compound surface. Slitting the PCAH may allow for the article pre-crushed aluminum honeycomb sheet 102 and/or impact attenuation article 101 to assume a curved shape without compromising the integrity of the intact honeycomb cells. In some embodiments the cuts or slits 112 may be produced using a tool such as a table top fixture holding a cutting tool (e.g. Dremel) as shown in FIG. 3. In preferred embodiments, this cutting or slitting is performed after the first pre-crushing step described above.

In some embodiments the pre-crushed aluminum honeycomb sheet 102 defines one or more slits 112. Slits 112 allow the pre-crushed aluminum honeycomb sheet 102 to have curvature by allowing islands 110 of cells 108 to separate from one another to varying degrees depending on the degree of curvature desired. For example, providing slits 112 between islands 110 of cells 108 allows the pre-crushed aluminum honeycomb sheet 102 to be molded to generally match the curvature of a helmet or a person's head.

The pre-crushed aluminum honeycomb sheet 102 of impact attenuation article 101 can have any number of islands 110 and slits 112 useful to allow the sheet 102 to be shaped to a desired curvature. In some embodiments the pre-crushed aluminum honeycomb sheet 102 is sized and dimensioned to fit within an opening or recess in a conventional helmet liner. In some embodiments the pre-crushed aluminum honeycomb sheet 102 has a thickness in a range from about 10 mm to about 20 mm, from about 12 mm to about 18 mm, or from about 14 mm to about 16 mm. In some embodiments the pre-crushed aluminum honeycomb sheet 102 is at least 10 mm thick, at least 12 mm thick, at least 14 mm thick, at least 16 mm thick, or at least 20 mm thick. In some embodiments the pre-crushed aluminum honeycomb sheet 102 has a thickness less than 20 mm.

In some embodiments the pre-crushed aluminum honeycomb sheet 102 may have a width of less than 6 inches, less than 5 inches, less than 4 inches, less than 3 inches, between about 1 inches and about 15 inches, between about 2 inches and about 10 inches, between about 3 inches and about 6 inches, about 2 inches, about 3 inches, about 4 inches, about 5 inches, or about 6 inches. In some embodiments the pre-crushed aluminum honeycomb sheet 102 may have a length of less than 6 inches, less than 5 inches, less than 4 inches, less than 3 inches, between about 1 inches and about 15 inches, between about 2 inches and about 10 inches, between about 3 inches and about 6 inches, about 2 inches, about 3 inches, about 4 inches, about 5 inches, or about 6 inches. In a preferred embodiment, a pre-crushed aluminum honeycomb sheet 102 is about 4 inches wide by about 4 inches long.

Figure 13:
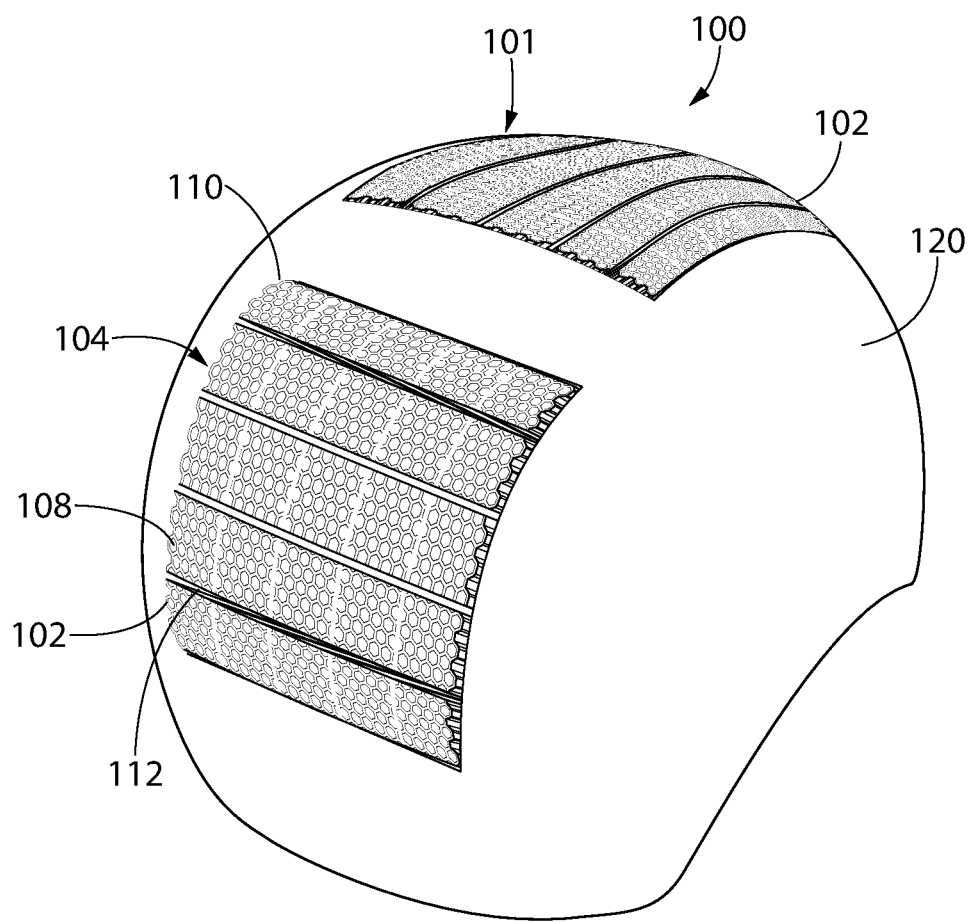
FIG. 13 is a back (exterior) perspective view of the plurality of impact attenuation articles inserted into a helmet liner body in a front-crown-rear configuration of FIG. 11A.

Referring to FIGS. 2A-2B and 13, in some embodiments the pre-crushed aluminum honeycomb sheet 102 may be generally rectangular or generally square in shape. In other embodiments (for example, as shown in FIGS. 14A-C and 15A-C, the pre-crushed aluminum honeycomb sheet 102 may have rounded sides or be generally oval. In still other embodiments the pre-crushed aluminum honeycomb sheet 102 may have the general shape of a rhombus.

Referring to FIGS. 2A-B, pre-crushed aluminum honeycomb sheet 102 may define eight slits 112 dividing the top surface 104 into twenty-five islands 110. In another embodiment, sheet 102 may define four slits 112 dividing the top surface 104 into nine islands 110. In another embodiment, sheet 102 may define six slits 112 dividing the top surface 104 into sixteen islands 110. In other embodiments, sheet 102 may define 2, 3, 4, 5, 6, 7, 8, 9, 10, or more slits 112. In some embodiments top surface 104 defines 4, 6, 8, 9, 10, 12, 14, 15, 16, 18, 20, 21, 22, 24, 25, 26, 28, 30, 32, 24, 35, 36, 38, 39, 40 or more islands 110. In some embodiments islands 110 have a substantially rectangular shape. In some embodiments islands 110 have a substantially square shape. In some embodiments islands 110 have a substantially triangular or diamond shape. It is understood that the islands 110 may have any shape suitable for providing the PCAH sheet 102 and/or impact attenuation article 101 with the desired curvature.

The slits 112 may be oriented parallel to one another, orthogonal to one another, or at another angle (e.g. 30° or 45°), so long as the slits extend from the top surface 104 toward the bottom surface 106 of pre-crushed aluminum honeycomb sheet 102 without extending through bottom surface 106. In some embodiments first slit 152, second slit 154, third slit 156, fourth slit 158 each extend partially through pre-crushed aluminum honeycomb sheet 102 from the top surface 104 toward the bottom surface 106. In embodiments where curvature of the top surface 104 and the bottom surface 106 pulls the islands 110 apart from one another, the slits 112 allow the pre-crushed aluminum honeycomb sheet 102 to curve and the slits 112 may have any width. In embodiments where the curvature of the top 104 and bottom 106 surfaces pushes islands together, the width of the slit has a bearing on whether any sideways crushing of the honeycomb islands takes place. For example, steeper compound surfaces would call for wider slits to minimize sideways crushing.

In some embodiments a slit 112 extends about 8 mm deep from the top surface 104 toward the bottom surface 106. In some embodiments a slit 112 extends about 9 mm, 10 mm, 11 mm, 12 mm, 13 mm, 14 mm, 15 mm, 16 mm, 17 mm, 18 mm, or 19 mm deep from the top surface 104 toward the bottom surface 106. In other embodiments slit 102 extends in a range of from about 6 mm deep to about 19 mm deep, from about 6 mm deep to about 16 mm deep, from about 6 mm deep to about 12 mm deep, from about 8 mm deep to about 19 mm deep, from about 8 mm deep to about 16 mm deep, from about 8 mm deep to about 12 mm deep, from about 12 mm deep to about 19 mm deep, from about 12 mm deep to about 16 mm deep, from about 16 mm deep to about 19 mm deep, or from about 10 mm deep to about 15 mm deep. In some embodiments slit 112 extends between about 70% and about 98% of the depth of sheet 102, between about 75% and about 98% of the depth of pre-crushed aluminum honeycomb sheet 102, between about 80% and about 98% of the depth of sheet 102, between about 85% and about 98% of the depth of sheet 102, or between about 90% and about 96% of the depth of sheet 102. Without extending through bottom surface 106, in some embodiments slit 112 extends greater than 70%, 75%, 80%, 85%, 90%, or 95% of the depth of sheet 102.

Figure 8:
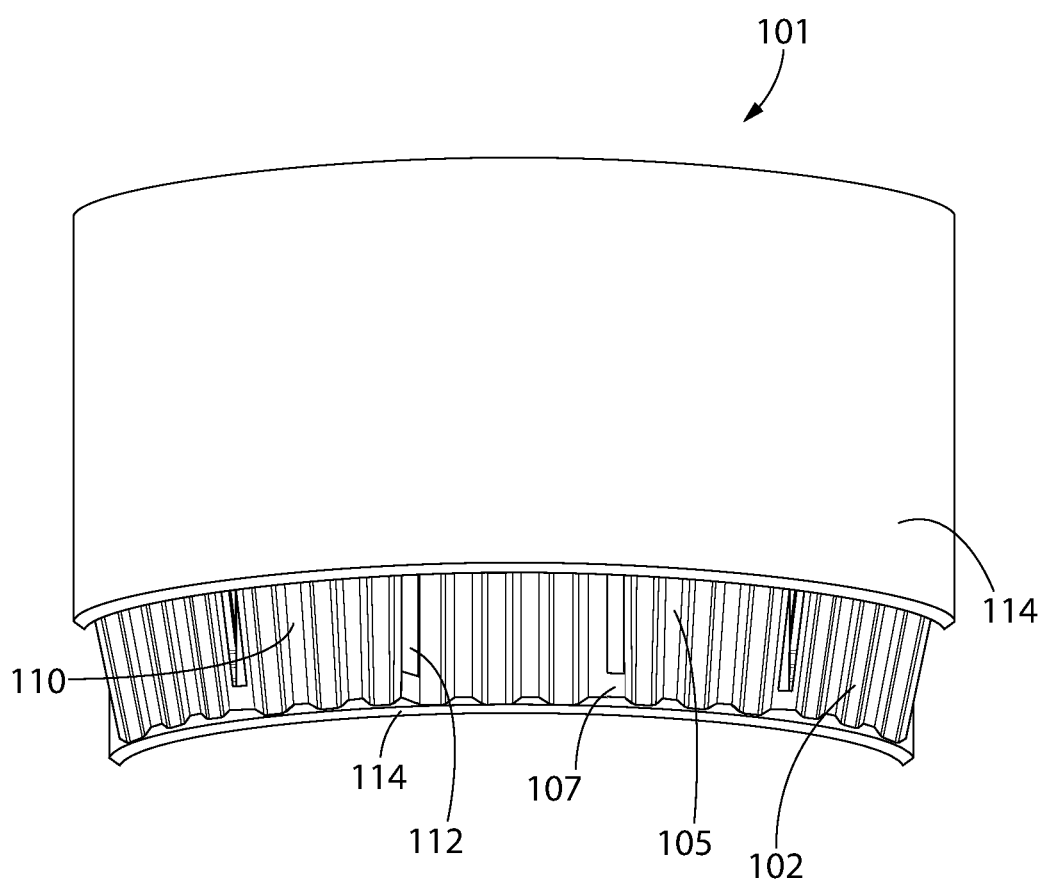
FIG. 8 is a perspective view of an impact attenuation article according to an embodiment of the invention.
Figure 9A:
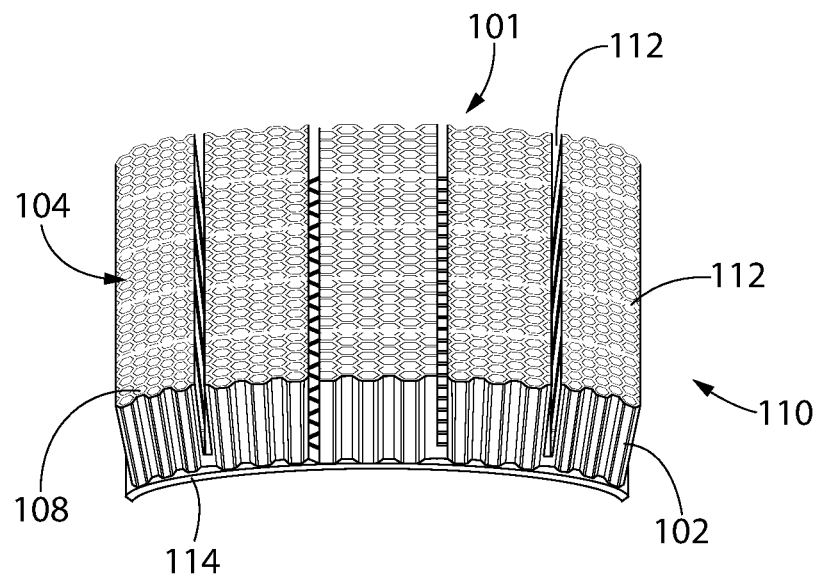
FIG. 9A is a top perspective view of an impact attenuation article comprising a slitted pre-crushed aluminum honeycomb sheet and given a compound shape, in accordance with an embodiment of the invention.
Figure 9B:
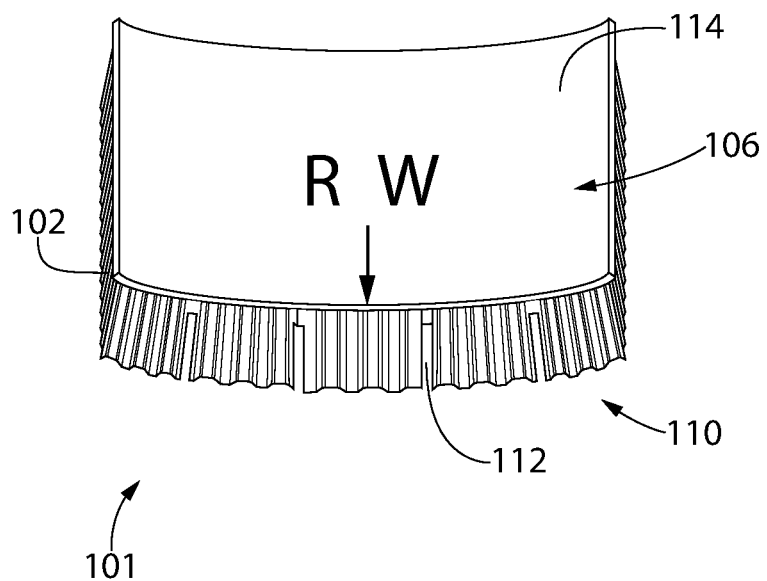
FIG. 9B is a bottom perspective view of an impact attenuation article comprising a slitted pre-crushed aluminum honeycomb sheet and given a compound shape, in accordance with an embodiment of the invention.

Referring to FIGS. 8 and 9A-9B, the pre-crushed aluminum honeycomb sheet 102 further comprises a top portion 105 and a bottom portion 107. The top portion 105 extends from top surface 104 to the bottom of slit 112, and bottom portion 107 extends from bottom surface 106 to the bottom of slit 112. In some embodiments the height of the bottom portion 107 of pre-crushed aluminum honeycomb sheet 102, can be calculated by subtracting the depth of slit 112 from the height of pre-crushed aluminum honeycomb sheet 102. In some embodiments the height of the bottom portion 107 is about 1/32 inch, about 1/16 inch, about 3/32 inch, about 1/8 inch, about 5/32 inch, about 3/16 inch, less than 1/4 inch, less than 3/16 inch, less than 5/32 inch, less than 1/8 inch, less than 3/32 inch, less than 1/16 inch, between 1/32 inch and 1/4 inch, between 1/32 inch and 3/32 inch, between 1/32 inch and 1/8 inch, or between 1/32 inch and 3/32 inch. If the height of the bottom portion 107 is too great, islands 110 may appear wrinkled down around the unslitted area when the second pre-crushing (also referred to as compounding) takes place.

Referring now to FIGS. 8 and 9A-9B, an impact test article 101 and/or a pre-crushed aluminum honeycomb sheet 102 may have a curvature such that top surface 104 has a convex curvature and bottom surface 106 has a concave curvature. The degree of curvature may generally fit with the curve of a wearer's head, the shape of a conventional impact liner, or the external surface of a helmet. In some embodiments a pre-crushed aluminum honeycomb sheet 102 may have a curvature such that top surface 104 has a concave curvature and bottom surface 106 has a convex curvature. In some embodiments, the slitted pre-crushed aluminum honeycomb sheet 102 may be shaped using a mold 400. In some embodiments mold 400 comprises a window frame fixture 430 and a map 432 as shown in FIGS. 6A-D and 7A-B.

Figure 7A:
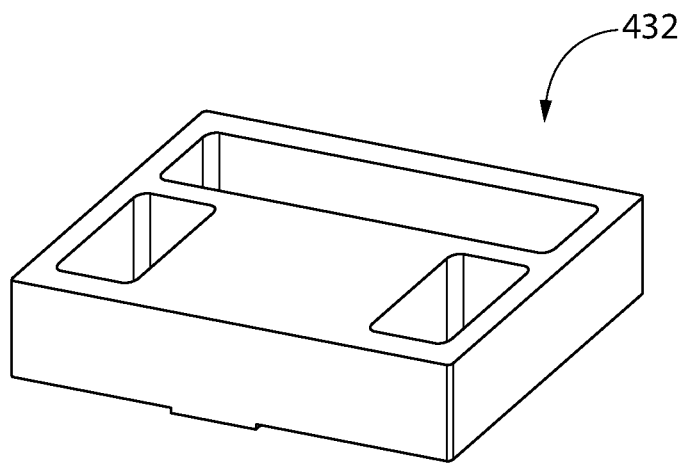
FIG. 7A is a perspective view of the top of a front map, in accordance with an embodiment of the invention.
Figure 7B:
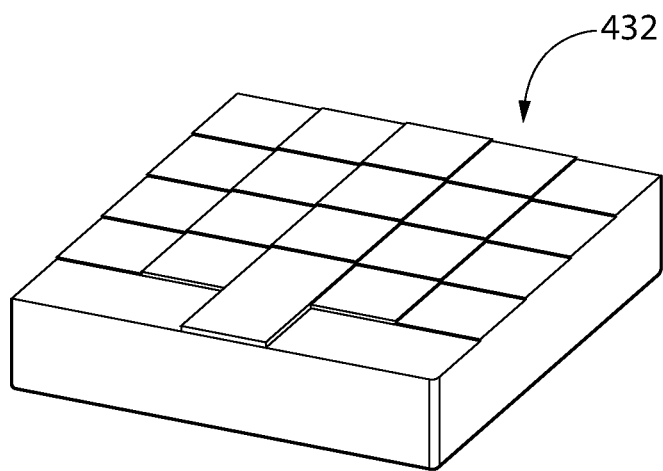
FIG. 7B is a perspective view of the bottom of a front map, in accordance with an embodiment of the invention.
Figure 22A:
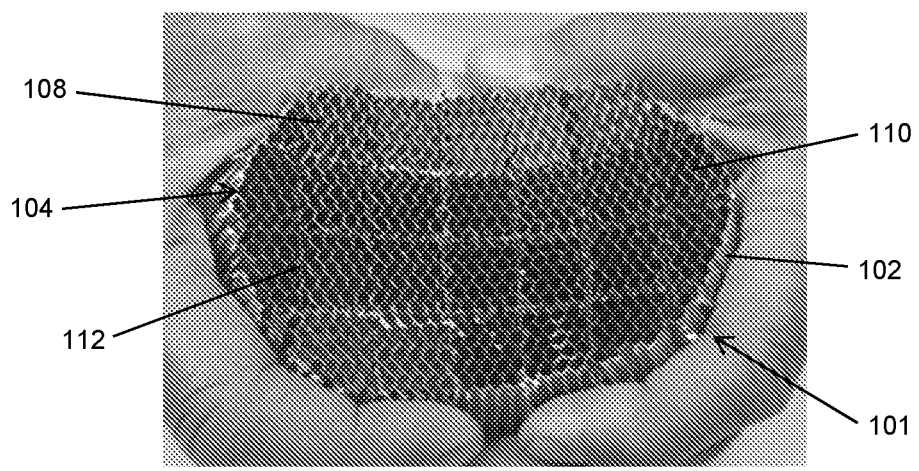
FIG. 22A is a bottom plan view of an impact attenuation article according to an embodiment of the invention.
Figure 22B:
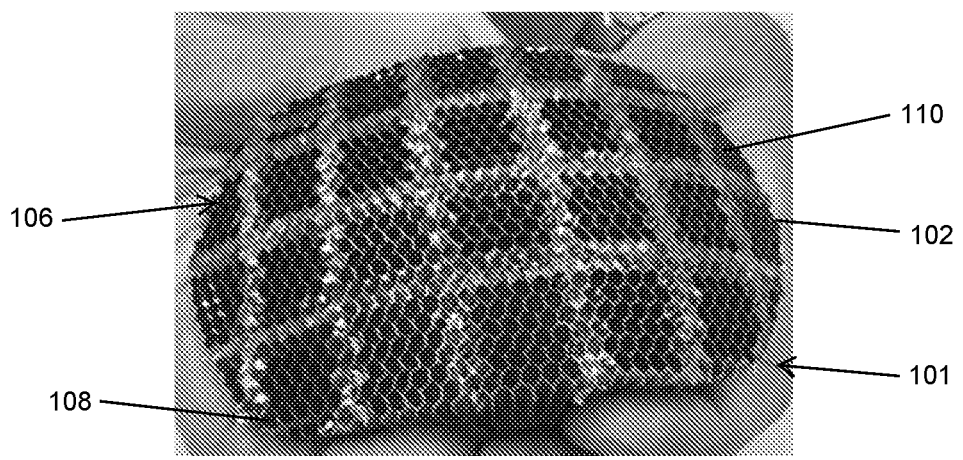
FIG. 22B is a top plan view (i.e. helmet side) of the impact attenuation article shown in FIG. 22A.

Referring now to FIGS. 22A and 22B, an impact attenuation article 101 and/or a pre-crushed aluminum honeycomb sheet 102 may have a curvature such that top surface 104 has a concave curvature and bottom surface 106 has a convex curvature. Such curvature will push islands 110 towards each other. The degree of curvature may generally fit with the curve of a wearer's head, the shape of a conventional impact liner, or the external surface of a helmet. In some embodiments, the slitted pre-crushed aluminum honeycomb sheet 102 may be shaped using a mold 400. In some embodiments mold 400 comprises a window frame fixture 430 and a map 432 as shown in FIGS. 6A-D and 7A-B In some embodiments, the slitted pre-crushed aluminum honeycomb sheet 102 may be shaped using a mold 400. In some embodiments mold 400 comprises a window frame fixture 430 and a map 432 as shown in FIGS. 6A-D and 7A-B. Referring still to FIGS. 6A-D and 7A-7B, a window frame fixture 430 and a 3D printed 'map' 432 may be used in conjunction to crush an uncrushed aluminum honeycomb sheet or a pre-crushed aluminum honeycomb sheet 102 to a specific thickness. When the press closes on the window frame fixture 430, the bottom surface of map 432 will contact and depress each small square of the uncrushed aluminum honeycomb sheet or pre-crushed aluminum honeycomb sheet 102 to the desired contour and thickness to form a slitted and mapped pre-crushed honeycomb sheet 102. In some embodiments map 432 may be divided into a number of areas corresponding to the number of islands 110 present in the pre-crushed aluminum honeycomb sheet 102. An embodiment of a front map is shown in FIG. 7A (top) and FIG. 7B (bottom). Similar maps may be designed for the crown and rear test articles. Referring now to FIGS. 9A-9B, the outer surface of the honeycomb sheet 102 now matches the inside surface of the helmet shell at the corresponding shell location.

Referring to FIGS. 8, 9A-9B, and 22C, an impact attenuation article 101 may further comprise a polymer skin 114. In some embodiments polymer skin 114 covers at least a portion of the bottom surface 106 of pre-crushed aluminum honeycomb sheet 102. Preferably, polymer skin 114 covers substantially all of bottom surface 106. In some embodiments a polymer skin 114 covers a portion or substantially all of a top surface 104 of sheet 102. In some embodiments both top surface 104 and bottom surface 106 are covered partially, substantially entirely, or entirely by a polymer skin 114. A polymer skin may comprise a binding polymer (e.g. polyester, vinyl ester, nylon, or a thermoset resin such as an epoxy), carbon fibers, and/or, one or more other materials (e.g., an aramid, aluminum, ultra-high-molecular-weight polyethylene, or glass fibers). In some embodiments polymer skin 114 comprises a carbon fiber reinforced polymer (CFRP). In some embodiments polymer skin 114 comprises fiberglass. In some embodiments, polymer skin 114 may comprise a single ply, or 2, 3, 4, 5, 6, 7, 8, 9, 10, 11, 12, 13, 14, 15 or more layers of polymer (e.g. carbon fiber reinforced polymer and/or fiberglass). In some embodiments, polymer skin 114 is attached to bottom surface 106 by an adhesive, such as a urethane adhesive. In some embodiments, at least the side of the pre-crushed aluminum honeycomb sheet that faces the helmet wearer's head will be covered with a layer of material (e.g. polymer skin 114) that protects the wearer's head from any sharp edges of the pre-crushed aluminum honeycomb sheet 102. In one embodiment, a first polymer skin 114 may be provided on the bottom surface 106 to protect the user's head and/or a second polymer skin may be provided on the top surface 104 to stiffen the article 101. In some embodiments the polymer skin 114 may protect the wearer's head from the pre-crushed aluminum honeycomb sheet 102. In some embodiments the polymer skin 114 may hold the islands 110 of pre-crushed aluminum honeycomb sheet 102 together when the top surface 104 of pre-crushed aluminum honeycomb sheet 102 has a concave curvature, causing the islands 110 to be compressed towards each other. In such an embodiment, the polymer skin 114 may be adhered to the top surface 104 (i.e. the slitted surface) of the pre-crushed aluminum honeycomb sheet, thereby holding the islands 110 in position and maintaining the desired curvature of the pre-crushed aluminum honeycomb sheet. In some embodiments, the polymer skin 114 is in the same contour as the inside surface of the liner body 120 section it is replacing. In some embodiments the polymer skin 114 is the same contour as the external surface of the helmet 300.

Figure 22C:
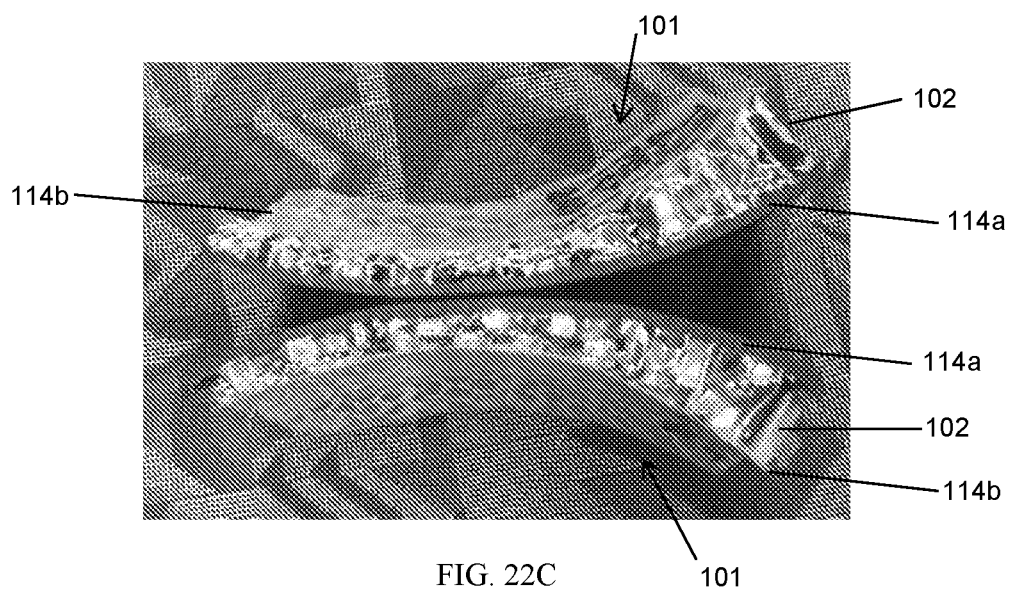
FIG. 22C is a side elevation view of impact attenuation articles according to an embodiment of the invention, post-testing.

Referring to FIG. 22C, the impact attenuation article may include a first polymer skin 114a, which covers the bottom surface 106. In some embodiments the first polymer skin 114a may comprise carbon fiber reinforced polymer. In some embodiments the first polymer skin 114a may comprise a plurality of layers of carbon fiber reinforced polymer, e.g. 1, 2, 5, 10, 15, or 20 layers of carbon fiber reinforced polymer. In some embodiments the first polymer skin 114a may comprise fiberglass. In some embodiments the impact attenuation article may include a second polymer skin 114b, which covers the top surface 104. In some embodiments the second polymer skin 114b serves to hold the islands 110 in place, and/or provides stability to the curved shape of the impact attenuation article 101. The second polymer skin 114b may comprise carbon fiber reinforced polymer. In some embodiments the second polymer skin 114b may comprise a plurality of layers of carbon fiber reinforced polymer, e.g. 1, 2, 5, 10, 15, or 20 layers of carbon fiber reinforced polymer. The second polymer skin 114b may comprise fiberglass. The degree of curvature may generally fit with the curve of a wearer's head, the shape of a conventional impact liner, or the external surface of a helmet. In some embodiments a pre-crushed aluminum honeycomb sheet 102 may have a curvature such that top surface 104 has a concave curvature and bottom surface 106 has a convex curvature.

In some embodiments an impact attenuation article 101 comprises or consists essentially of a pre-crushed aluminum honeycomb sheet 102 and a polymer skin 114. Such embodiments may provide the advantage of being simpler, lighter weight, and/or less expensive to manufacture than other impact attenuation articles. In some embodiments an impact attenuation article 101 comprises or consists essentially of a pre-crushed aluminum honeycomb sheet 102 and a first polymer skin 114 comprising a carbon fiber reinforced polymer and a second polymer skin 114 comprising a fiberglass. In some such embodiments the first polymer skin covers a first surface (e.g. a bottom surface 106) of the pre-crushed aluminum honeycomb sheet 102 and the second polymer skin covers a second surface (e.g. a top surface 104) of the pre-crushed aluminum honeycomb sheet 102. In some such embodiments the first polymer skin covers a first surface (e.g. a top surface 104) of the pre-crushed aluminum honeycomb sheet 102 and the second polymer skin covers a second surface (e.g. a bottom surface 106) of the pre-crushed aluminum honeycomb sheet 102. In another specific embodiment the first polymer skin 114 comprises 5 layers of carbon fiber reinforced polymer fabric. In another specific embodiment the first polymer skin 114 comprises 10 layers of carbon fiber reinforced polymer fabric.

Figure 20:
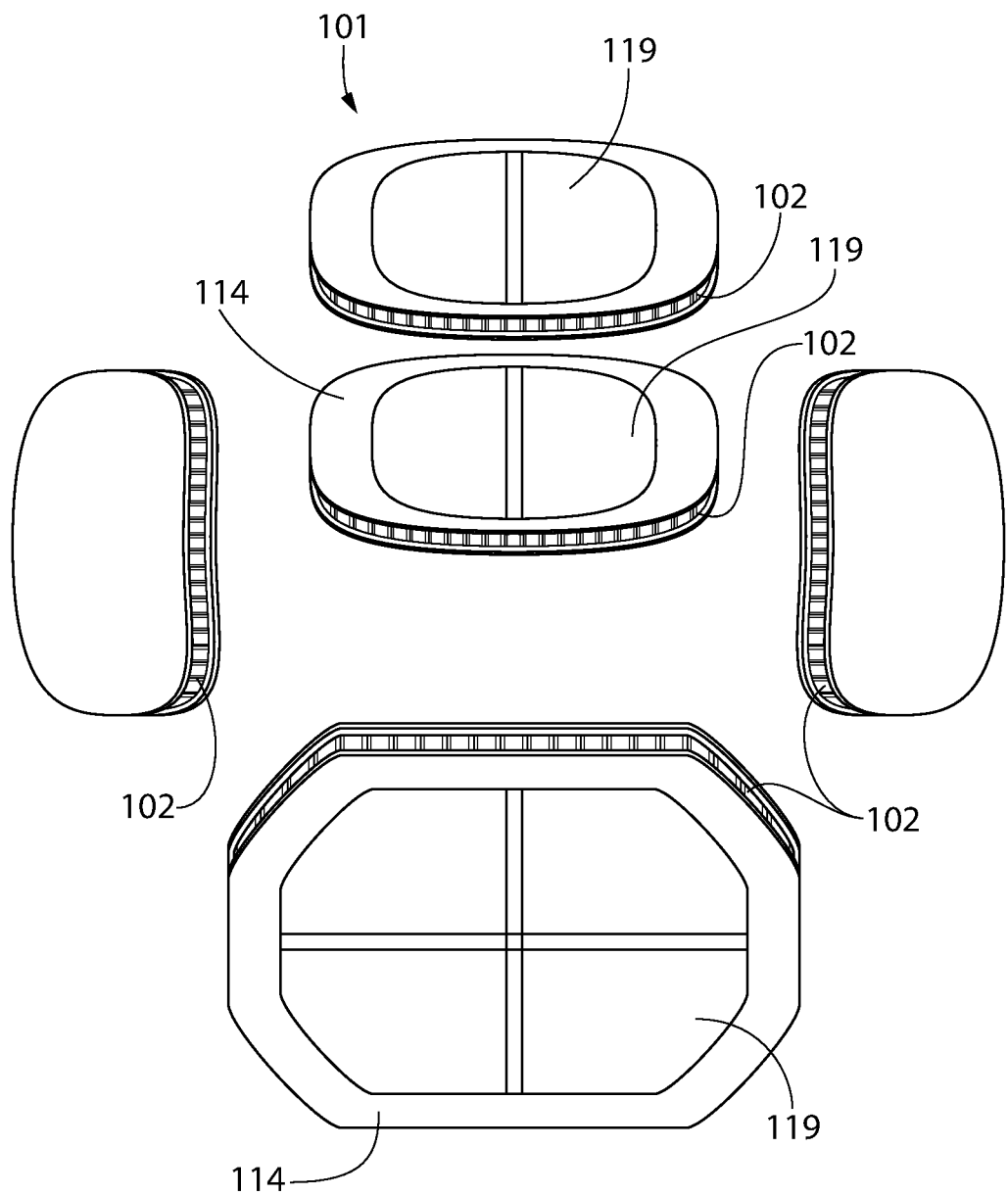
FIG. 20 is a bottom plan view (i.e. head side) of a set of impact attenuation articles comprising carbon fiber reinforced polymer on both sides of the pre-crushed aluminum honeycomb, according to an embodiment of the invention.
Figure 21:
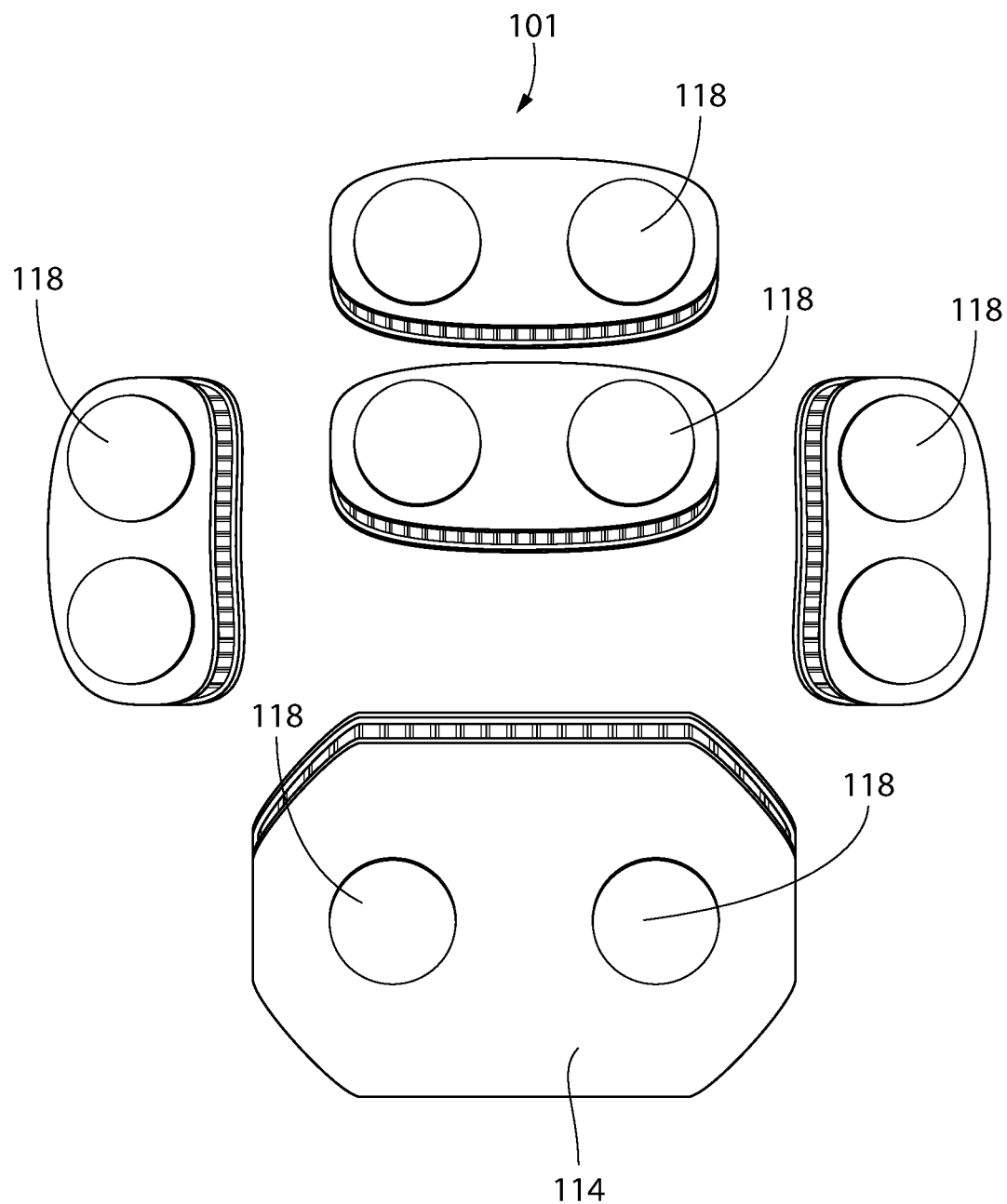
FIG. 21 is a top plan view of the set of impact attenuation articles shown in FIG. 20.

FIGS. 15A-C and 16 show a polymer skin 114 facing the wearer's head for protection from the pre-crushed aluminum honeycomb sheet 102. FIGS. 20 and 21 show impact attenuation article 101 comprising at least one ply of polymer skin 114 to the side of the impact attenuation article 101 facing the inside of the helmet shell (i.e. to top surface 104 of pre-crushed aluminum honeycomb sheet 102). FIG. 20 shows the head side of the pad set including comfort pad 119, polymer skin 114, and pre-crushed aluminum honeycomb sheet 102. FIG. 21 shows the helmet shell side of the pad set including hook and loop (such as Velcro) coin 118 and polymer skin 114. In this instance, two plies of polymer skin 114 have been cured onto the pre-crushed aluminum honeycomb sheet 102. In such an embodiment, the thickness of the pre-crushed aluminum honeycomb sheet 102 may be reduced to accommodate the two plies of polymer skin 114 resulting in a reduced thickness of honeycomb for crushing on impact.

Referring to FIGS. 13A-C, an impact attenuation article 101 may further comprise an adhesive material 116 covering at least a portion of top surface 104 of the pre-crushed aluminum honeycomb sheet 102 (the adhesive material 116 may be in direct contact with the pre-crushed aluminum honeycomb sheet 102, in some embodiments, while in other embodiments one or more layers of other materials may intervene between the adhesive material 116 and the pre-crushed aluminum honeycomb sheet 102). In some embodiments the adhesive material may comprise a plurality of hooks and/or loops. In some embodiments impact liner 100 may be sized and shaped and include an adhesive material to allow the impact liner 100 to replace conventional pads in a helmet. In some embodiments impact liner 100 may further include one or more comfort pads disposed on polymer skin 114 or bottom surface 106.

In some embodiments the impact attenuation article 101 may define a notch or void to provide a clearance for a strap (e.g. webbing) when the impact attenuation article 101 is positioned in a helmet.

In some embodiments, impact liner system 100 is configured to provide different levels of impact attenuation to different locations around the wearer's head. For example, impact liner system 100 may be configured to provide greater or lesser impact attenuation at the crown or front of the head versus the left and right sides. In some embodiments, different levels of impact attenuation can be achieved by having a liner body 120 with different densities of the impact-absorbing material at the different locations. In some embodiments, liner body 120 may include denser material at locations where greater impact attenuation is desired. In other embodiments, liner body 120 may have a variable thickness, for example, such that liner body 120 is thicker at portions where greater impact attenuation is desired. In some embodiments liner body 120 may have holes or recesses in which an impact attenuation article 101 is disposed.

In some embodiments, liner body 120 is constructed from an impact-absorbing material. In some embodiments, for example, liner body 120 is made of expanded polypropylene. In other embodiments, liner body 120 is made of expanded polystyrene (EPS). In further embodiments, liner body 120 may be made of open or closed cell polyurethane, blends of PVC and acrylonitrile butadiene rubber (NBR) (such as foam materials available under the ENSOLITE® brand), or other energy-absorbing foams known in the art. In some embodiments, liner body 120 is substantially rigid. In other embodiments, liner body 120 may be elastic or flexible. In some embodiments, liner body 120 is of a single-piece construction, having a unitary or monolithic structure. In some embodiments liner body 120 is sufficiently sized to extend from the forehead of the wearer to the back of the head of the wearer during use. In some embodiments, liner body 120 is sized to extend from the forehead of the wearer to the nape of the neck of the wearer during use. In some embodiments, liner body 120 includes an outer surface that is convexly contoured to generally match the interior curvature of helmet 300.

In one embodiment, liner body 120 is shaped such that it retains the same shape whether or not it is coupled to the helmet 300 and/or the user's head. In some embodiments, liner body 120 is dimensioned to fit along the interior of helmet 300 from the front of helmet 300 to the back of helmet 300. In some embodiments, liner body 120 is configured to entirely fit within the interior of helmet 300 and to not extend beyond the periphery of helmet 300 during use. In some embodiments, liner body 120 includes an interior surface that is concavely contoured to fit around the wearer's head during use. In some embodiments, liner body 120 has a generally uniform thickness between the convex outer surface 122 and the concave interior surface 124. In some embodiments, liner body 120 has a thickness in a range from about 10 mm to about 20 mm, from about 12 mm to about 18 mm, or from about 14 mm to about 16 mm. In some embodiments, liner body 120 is at least 10 mm thick, at least 12 mm thick, at least 14 mm thick, at least 16 mm thick, at least 18 mm thick, or at least 20 mm thick. In some embodiments, liner body 120 has a thickness less than 20 mm.

In some embodiments, impact liner system 100 further includes a plurality of pads 119 that are configured to provide cushioning between the wearer's head and liner body 120 during use. In some embodiments, a total of two to twelve pads 119 are provided with impact liner system 100. In some embodiments, impact liner system 100 is provided with three, four, five, six, seven, eight, nine, or ten pads 119. In some embodiments, each of pads 119 has substantially the same shape. In other embodiments, pads 119 may include different shapes. In some embodiments, pads 119 may be square, rectangular, circular, or irregularly shaped. In some embodiments, each pad 119 has a thickness in a range from about 6 mm to about 20 mm, about 8 mm to about 18 mm, about 10 mm to about 16 mm, or about 12 mm to about 14 mm before compression. In some embodiments, each pad 119 is at least 6 mm thick, at least 8 mm thick, at least 12 mm thick, at least 14 mm thick, at least 16 mm thick, or at least 18 mm thick before compression. In one embodiment, each pad 119 is about 13 mm thick before compression. In further embodiments, each pad 119 has a width of about 40 to about 60 mm and a length of about 80 mm to about 110 mm. In one embodiment, each pad 119 has a width of about 50 mm and a length of about 95 mm.

In some embodiments, pads 119 are made from a material that is different than the material used to construct liner body 120. In some embodiments, pads 119 may include a soft or resilient material, such as compressible foam. In other embodiments, pads may include a gel material. In some embodiments, pads include a viscoelastic material. In certain preferred embodiments, pads 119 are constructed from a breathable material. In some embodiments, each of pads 119 is made from reticular foam that is enclosed in fabric. In some embodiments, pads 119 include a foam that is less dense than the impact-absorbing material of liner body 120. In some embodiments, pads 119 include plastic open cell reticular foam enclosed in a fleece material. In some embodiments, pads 119 are made from materials that do not substantially absorb or retain water. In some embodiments, pads 119 include foam having open cells that allow for drainage of water. In some embodiments, pads 119 are made from materials that absorb less water than certain polyurethane foams, such as those available under the ZORBIUM® brand.

Referring now to FIGS. 10A, 10B, 11A, 11B, and 13, an impact liner system 100 for a helmet is disclosed. In some embodiments an impact liner system 100 includes a liner body 120 sized and configured to fit within an interior of the helmet and around a portion of a wearer's head, and an impact attenuation article 101. The impact attenuation article 101 may comprise a pre-crushed aluminum honeycomb sheet 102 having a top surface 104 (faces away from a wearer's head when used in conjunction with a helmet) and a bottom surface 106 (faces towards a wearer's head when used in conjunction with a helmet), the pre-crushed aluminum honeycomb sheet 102 defining a plurality of approximately hexagonally shaped cells 108, wherein the bottom surface 106 defines a single sheet of contiguous cells 108 and the top surface 104 defines two or more islands of contiguous cells separated by one or more slits 112. In some embodiments the liner body 120 comprises an impact-absorbing material and having an outer surface 122 with a convex curvature and an interior surface 124 with a concave curvature; wherein the liner body 120 defines one or more holes extending from the outer surface through the inner surface. In some embodiments the pre-crushed aluminum honeycomb sheet 102 comprises a top surface 104 and a bottom surface 106, the pre-crushed aluminum honeycomb sheet 102 defining a plurality of approximately hexagonally shaped cells 108, wherein the bottom surface 106 defines a single sheet of contiguous cells 108 and the top surface 104 defines two or more islands 110 of contiguous cells 108 separated by one or more slits 112; wherein the pre-crushed aluminum honeycomb sheet 102 is disposed in the one or more holes 126 such that the top surface 104 is generally aligned with the outer surface 122 of the liner body 120 and the bottom surface 106 is generally aligned with the interior surface 124 of the liner body 120. In some embodiments, an impact attenuation article 101 is placed in a similarly shaped cut out from the impact liner 120 (e.g. an EPS impact liner) as shown in FIGS. 10A-11B.

In some embodiments an impact attenuation article 101 may cover all or substantially all of inner surface of liner body 120. In other embodiments, impact attenuation article 101 may be sized and shaped to fit into openings or recesses within liner body 120. In some embodiments liner body 120 defines three holes 126 each configured to receive a pre-crushed aluminum honeycomb sheet 102. In some embodiments liner body 120 defines one hole, two holes, four holes, five holes, or more holes each configured to receive a pre-crushed aluminum honeycomb sheet 102. In some embodiments the holes 126 are arranged in a side-to-side or headband configuration. In other embodiments the holes 126 are arranged in a front-crown-rear configuration. In some embodiments, holes 126 may be sized and dimensioned to receive a similarly sized and dimensioned pre-crushed aluminum honeycomb sheet 102. In some embodiments pre-crushed aluminum honeycomb sheet 102 is sized and dimensioned to provide impact attenuation to a wearer.

Figure 10B:
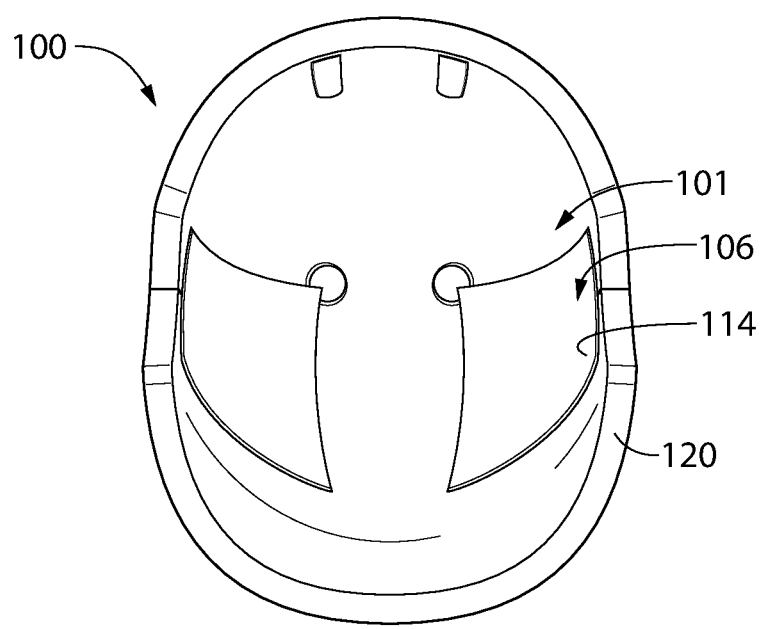
FIG. 10B is a bottom (interior) plan view of the plurality of separate impact attenuation articles inserted into a helmet liner body of FIG. 10A.
Figure 12:
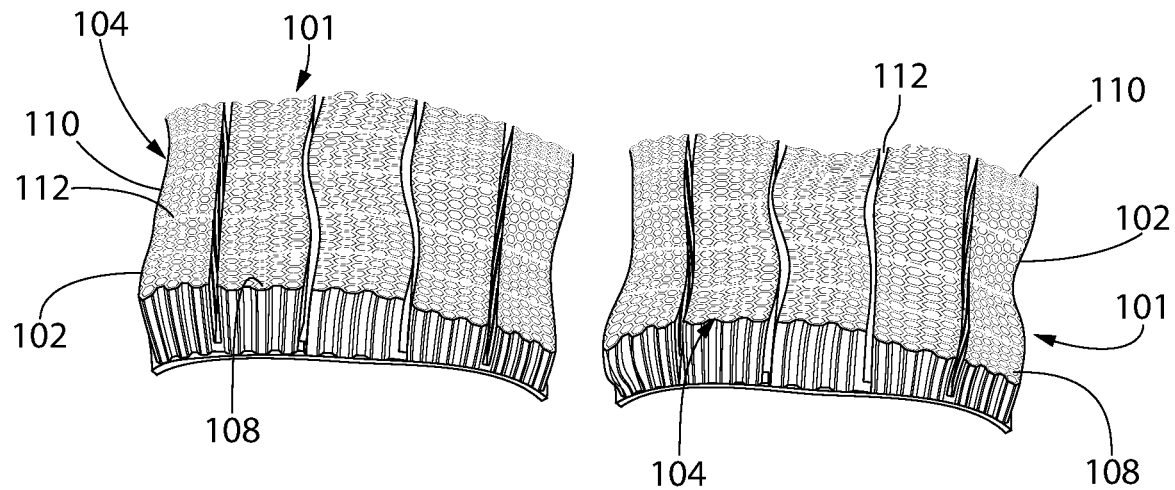
FIG. 12 is a perspective view of a plurality of separate impact attenuation articles each comprising pre-crushed aluminum honeycomb and carbon fiber reinforced polymer, in accordance with an embodiment of the invention, after impact testing in a side-to-side (headband) configuration.

Referring to FIGS. 10A-10B, in an embodiment the impact attenuation article 101 may be in a side-to-side configuration for what is known as a 'headband' configuration. FIGS. 10A-10B show left and right as worn (in a headband configuration) impact attenuation articles, pre-testing, with 10A showing the top surface 104 and 10B showing the polymer skin 114. FIG. 12 shows left and right impact attenuation articles, post-testing in a headband configuration.

Figure 11A:
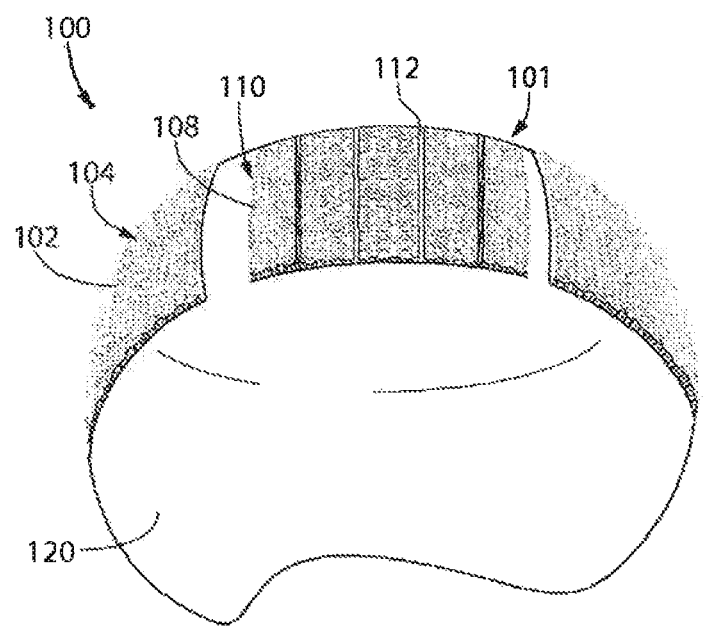
FIG. 11A is a top (exterior) perspective view of a plurality of impact attenuation articles inserted into a helmet liner body in a front-crown-rear configuration, in accordance with an embodiment of the invention.
Figure 11B:
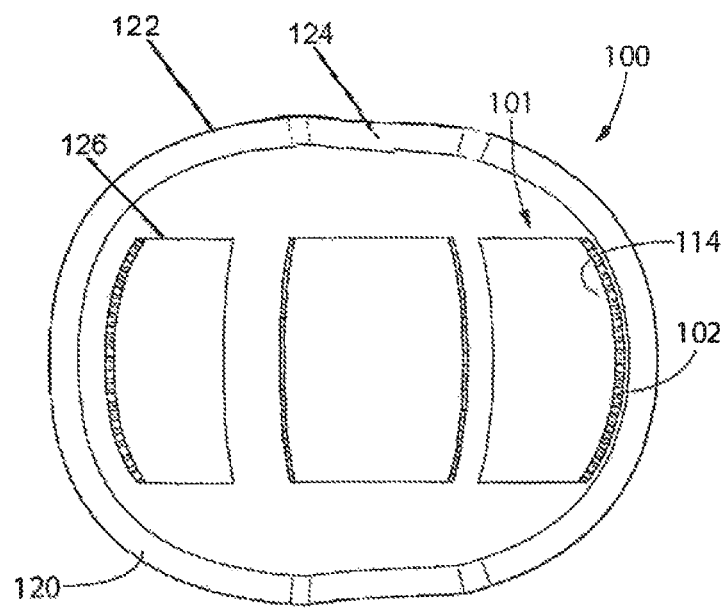
FIG. 11B is a bottom (interior) perspective view of the plurality of separate impact attenuation articles inserted into a helmet liner body in a front-crown-rear configuration of FIG. 11A.

Referring to FIGS. 11A-11B, in another embodiment the pre-crushed aluminum honeycomb article 101 may be in a 'front-crown-rear' configuration. FIGS. 11A-11B show front-crown-rear impact attenuation articles, pre-testing, with 11A showing the top surface 104 and 11B showing the polymer skin 114. FIGS. 9A-9B show a right-side-as-worn (RW) (e.g. in a headband configuration) impact attenuation article, pre-testing, with 9A showing the top surface 104 and 9B showing the polymer skin 114.

An advantage of embodiments of the impact attenuation system 100 of the present invention is that impact tests of the embodiments of the present invention have shown that for the HGU-56/P U.S. Army rotary wing helmet, a large head can now be fitted into a medium helmet; i.e., the helmet wearer can move down one size because the honeycomb energy absorbing liner can be thinner.

An impact attenuation article 101 may be fabricated for a ground helmet in a similar fashion as for an aircrew helmet. Most existing ground helmets comprise either an aramid shell or a polyethylene (PE) hybrid construction. The PE helmet shells are lighter than an aramid shell but are also much more flexible and this flexibility becomes a liability when attempting to design a ground helmet shell for higher impact energies. The pad geometry may be different for a ground helmet compared to an air helmet and include a layer of comfort foam that is currently used on the existing pads for human factors considerations.

Figure 14A:
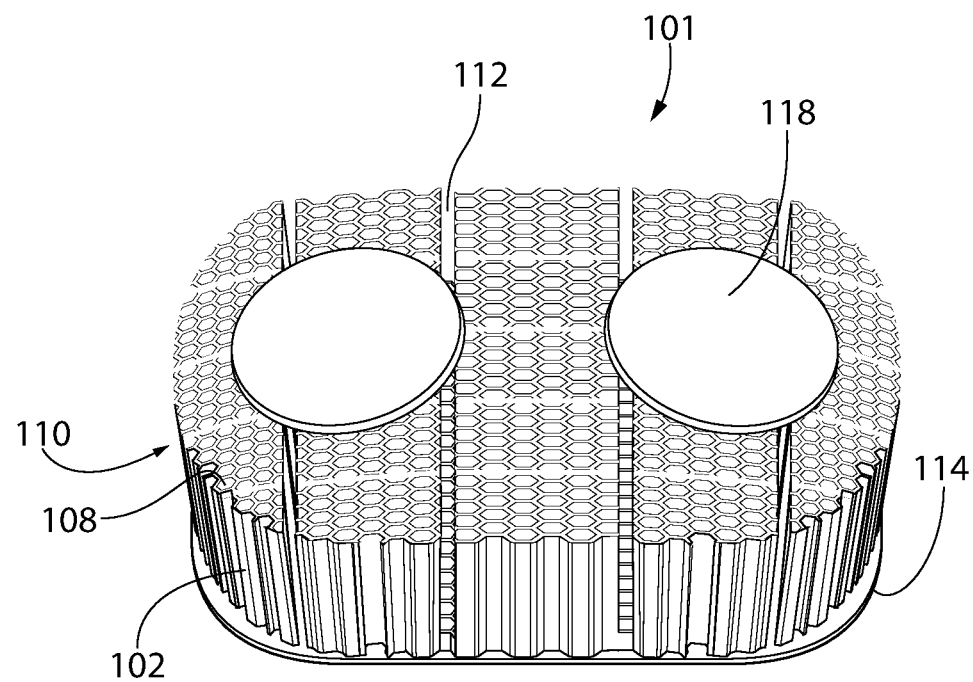
FIG. 14A-C are top (i.e. the side that would face the inner surface of a helmet) perspective views of impact attenuation articles comprising pre-crushed aluminum honeycomb and carbon fiber reinforced polymer pads for a ground helmet, according to embodiments of the invention.
Figure 14B:
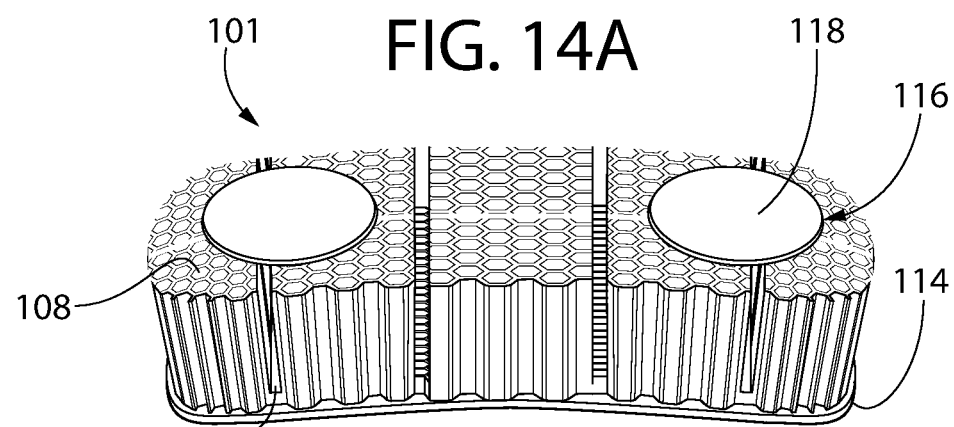
Figure 14C:
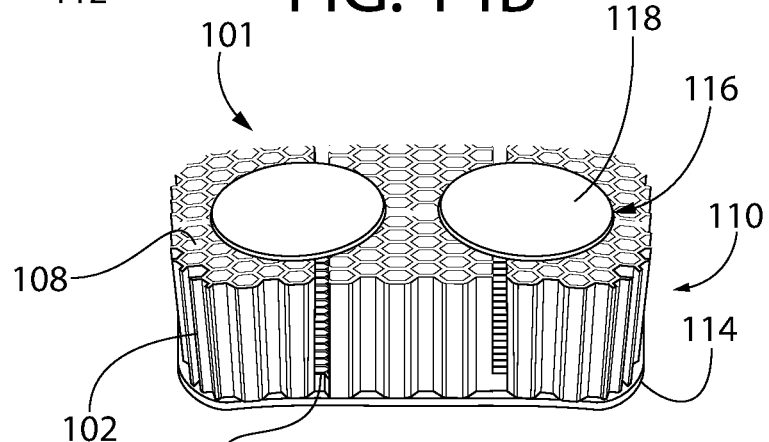
Figure 15A:
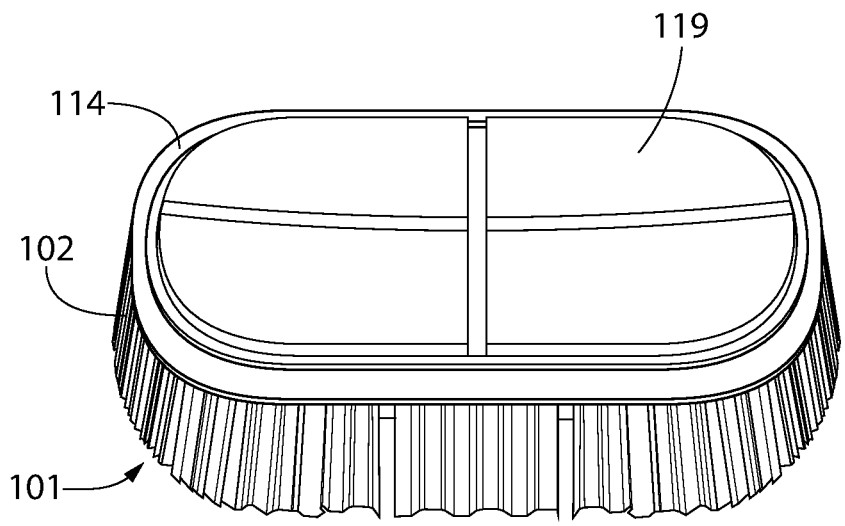
FIG. 15A-C are bottom (i.e. the side that would face a wearer's head) perspective views of the impact attenuation articles of FIGS. 14A-C comprising pre-crushed aluminum honeycomb and carbon fiber reinforced polymer pads for a ground helmet.
Figure 15B:
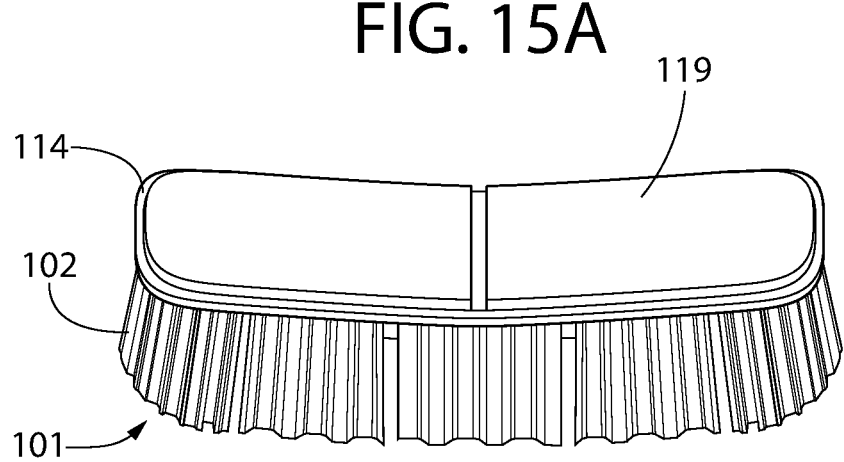
Figure 15C:
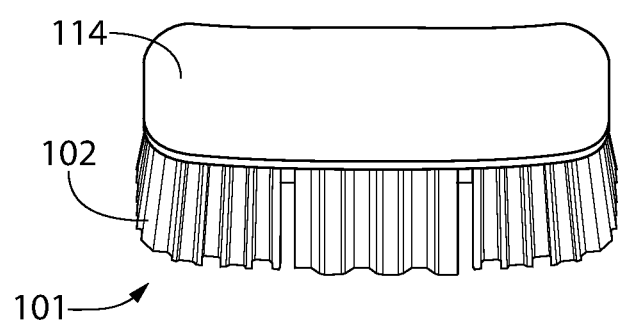

Referring to FIGS. 14A-C and 15A-C, hook and loop coins 118 may also be added to the impact attenuation article 101 so that the impact attenuation article 101 can be placed into the helmet the same way the incumbent pads are placed. FIGS. 14A-C shows the impact attenuation articles 101 core side up and FIGS. 15A-C shows the impact attenuation articles 101 with the polymer skin 114 and comfort pads 119. Referring to FIG. 16, the impact attenuation article 101 may be placed into the helmet in the locations used normally by incumbent pads.

Figure 23:
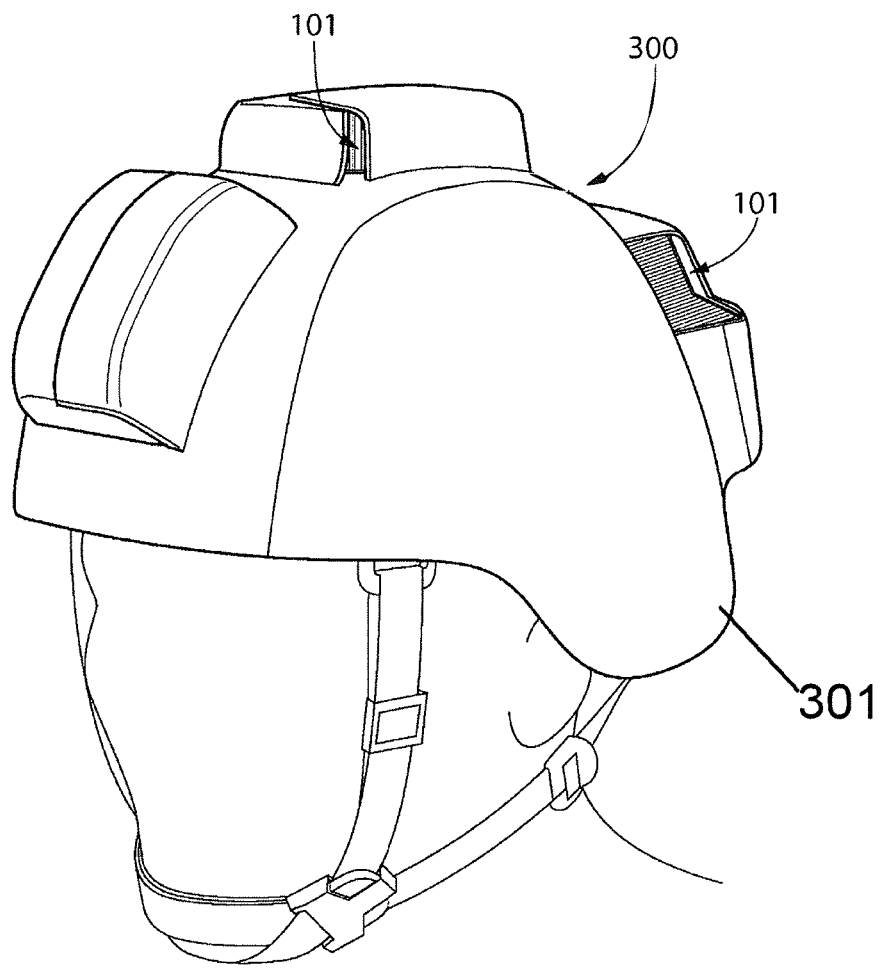
FIG. 23 is a front perspective view of a helmet in accordance with an embodiment of the invention shown on a mannequin.

Referring to FIG. 23, in some embodiments one or more impact attenuation articles 101 may be disposed on an external surface 301 of a helmet. In the embodiment shown in FIG. 23, three articles 101 are disposed in a front-crown-rear configuration, but any number of articles 101 may be placed in any configuration to provide impact attenuation to a wearer. In some embodiments an impact attenuation article 101 for use on an external surface 301 of a helmet 300 may comprise a PCAH sheet 102, and in some embodiments may further comprise a polymer skin 114. The pre-crushed aluminum honeycomb sheet 102 and polymer skin 114 may be layered or provided in a sandwich structure. In some embodiments, an externally mounted load distribution means (e.g. an externally mounted impact attenuation article 101) may be important to effectively attenuating internally transmitted impact energy. In some embodiments, an externally mounted impact attenuation article 101 may act as an external load/impact energy distribution element) and may be beneficial when the helmet composite shell is flexible, as is the case with polyethylene (PE). In some embodiments an externally disposed impact attenuation article may be removable. Such embodiments may be particularly useful, for example, to a soldier wearing a ground helmet but parachuting towards the ground where a mission is to be conducted; the externally mounted impact attenuation article (also referred to as a "bump cap") may provide additional impact protection during descent and landing and after landing the bump cap could be removed, thus reducing bulk and weight. In some embodiments the removal of the bump cap would provide external surface of the helmet which could be used to receive other componentry useful for the ground mission. In some embodiments a helmet may be provided with a pocket or adhesive (e.g. hook and/or loop surface) for receiving an external impact attenuation article, which may be attached by the user of the helmet according to his need.

In some embodiments a method of manufacturing an impact attenuation article 101 for a helmet comprises providing a pre-crushed aluminum honeycomb sheet 102 having a top surface 104 and a bottom surface 106; cutting the pre-crushed aluminum honeycomb sheet 102 in a direction orthogonal to the top 104 and bottom 106 surfaces to form one or more slits 112 that extend from the top surface 104 to a middle portion of the pre-crushed aluminum honeycomb sheet 102; and pressing the slitted pre-crushed aluminum honeycomb sheet in a mold 400 to provide a shaped pre-crushed aluminum honeycomb sheet. In some embodiments a method further includes providing an aluminum honeycomb sheet having a top surface and a bottom surface and crushing the sheet in a direction orthogonal to the top surface and bottom surface to form a pre-crushed aluminum honeycomb sheet. In some embodiments the sheet is crushed less than about $\frac{1}{12}$ inch. In other embodiments the sheet is crushed less than about $\frac{1}{16}$ inch. In some embodiments the method may further include coupling a polymer skin 114 to a surface of the shaped pre-crushed aluminum honeycomb sheet 102.

Impact attenuation article 101 can be arranged in different manners and comprise different materials according to the specific need. For example, in some embodiments the pre-crushed honeycomb sheet 102 can be slitted and curved such that the islands 110 are spread apart (e.g. FIGS. 9A and 9B). In other embodiments, the pre-crushed honeycomb sheet 102 can be slitted and curved such that the islands 110 are pushed together (e.g. FIG. 24), thereby slightly increasing the density of the impact attenuation article 101 and also increasing the crush strength of the impact attenuation article 101.

Figure 19:
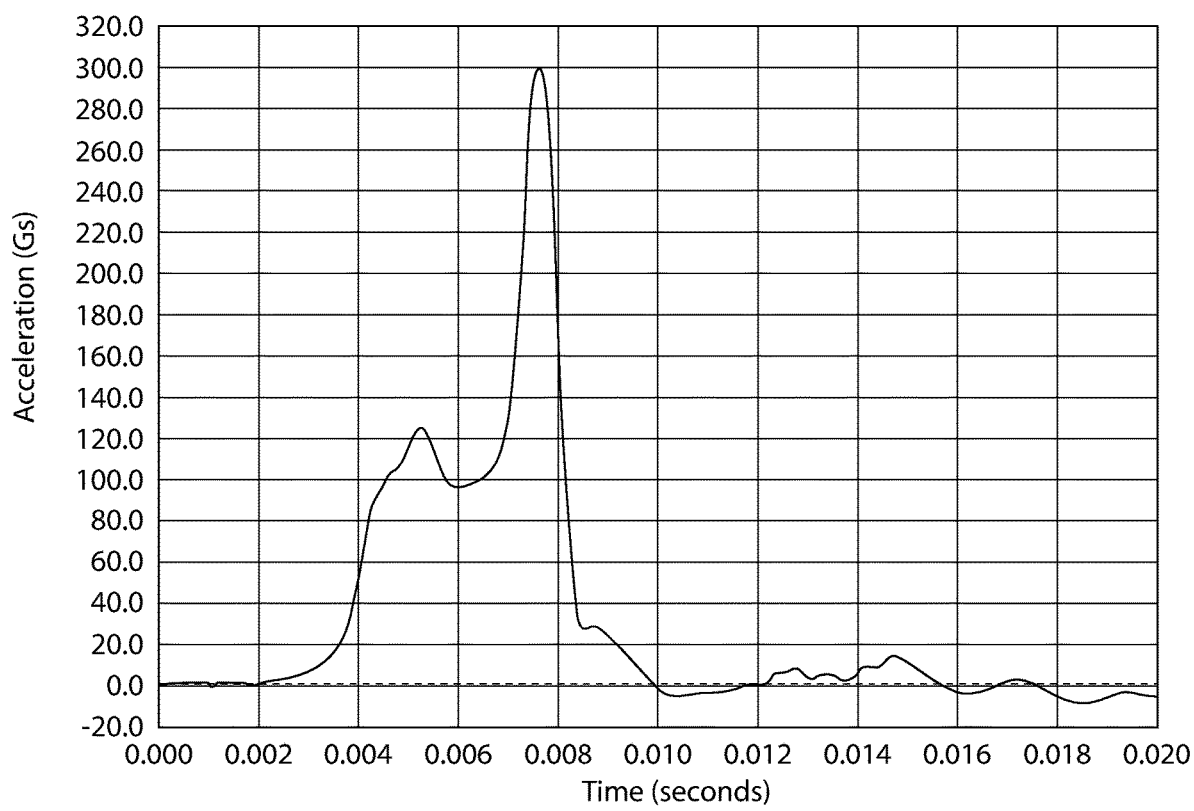
FIG. 19 is the output display of impact testing of an impact attenuation article according to an embodiment of the invention on a hemi-anvil.

FIG. 19 is a graph of an impact on a hemi anvil of an embodiment in which no plies of polymer skin 114 were added to the helmet side of the pre-crushed aluminum honeycomb sheet 102. The initial portion of the graph shows the honeycomb crushing (well below the limit of 150 G) but when it is totally crushed, the acceleration spikes. In some embodiments, adding one or more layers (plies) of polymer skin 114 (e.g. CFRP) to the helmet side of the pre-crushed aluminum honeycomb sheet allows the impact load to be absorbed over a larger area of the pre-crushed aluminum honeycomb sheet 102 before total crushing occurs. In another embodiment progressively stronger pre-crushed aluminum honeycomb sheet 102 may be used instead of adding polymer skin 114 plies; such an embodiment may reduce the maximum acceleration to below the permitted maximum.

To test the impact attenuation of an impact attenuation article 101, a carriage/test helmet (comprising the impact attenuation article 101) assembly is raised over the top of a tower (e.g. over nine feet up the tower from an anvil) along a monorail and then released into a free fall towards the anvil. This height the assembly is raised above the anvil is referred to as the "drop height." For lower velocities (and therefore less impact energy input) a lesser drop height is used in testing, A flat or hemispherical "hemi" anvil may be used. A hemi anvil presents a different threat to the impact attenuation article 101 than a flat anvil. Impact requirements may be set forth by consumers and are typically stated in terms of feet per second (ft/s) or meters per second (m/s) of impact velocity. Some helmet impact requirements are stated at two different impact velocities; e.g., 10 ft/s and 14 ft/s or 23 ft/s and 16.5 ft/s, and most are stated as double impacts at the same location of the test helmet.

In some embodiments an impact attenuation article meets the requirements set forth in the Ministry of Defence UK Defence Standard 05-102 (Issue 2, published Nov. 27, 2015) for Military Aircrew Helmet Impact Standard (MAHIS). In some embodiments an impact attenuation article does not exceed 300 Gs when dropped against a flat anvil at 7 meters per second (i.e. 23 feet per second). In some embodiments an impact attenuation article does not exceed 300 Gs when dropped against a flat anvil at 5 meters per second (i.e. 16.5 feet per second). In some embodiments an impact attenuation article does not exceed 300 Gs when dropped against a flat anvil at 7 meters per second (i.e. 23 feet per second) or when subsequently dropped against a flat anvil at 5 meters per second (i.e. 16.5 feet per second). In some embodiments an impact attenuation article does not exceed 300 Gs when dropped against a hemi anvil at 7 meters per second (i.e. 23 feet per second). In some embodiments an impact attenuation article does not exceed 300 Gs when dropped against a hemi anvil at 5 meters per second (i.e. 16.5 feet per second). In some embodiments an impact attenuation article does not exceed 300 Gs when dropped against a hemi anvil at 7 meters per second (i.e. 23 feet per second) or when subsequently dropped against a hemi anvil at 5 meters per second (i.e. 16.5 feet per second).

Figure 17:
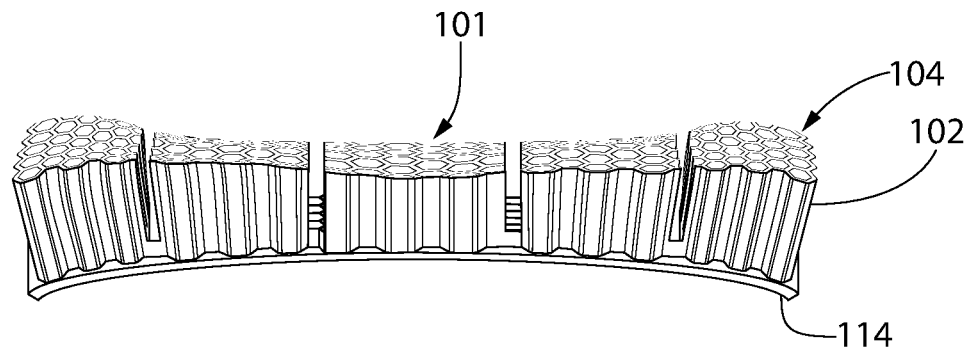
FIG. 17 is a side elevation view of an impact attenuation article comprising pre-crushed aluminum honeycomb, according to an embodiment of the invention, impacted on a flat anvil.

FIG. 17 shows a post-test drawing of a honeycomb impact liner test article after contact with a flat anvil. In the instance where the honeycomb was almost totally crushed the area of crushed honeycomb will be maximized; that is, a sizeable area of the pre-crushed aluminum honeycomb sheet 102 makes contact with the flat anvil. Tables 1, 2, and 3 of the Examples are examples of impacts on a flat anvil. It has been found that an embodiment of an impact attenuation article 101 consisting essentially of a pre-crushed aluminum honeycomb sheet 102, a polymer skin 114, and optionally an adhesive to attach the polymer skin 114 to the pre-crushed aluminum honeycomb sheet 102 successfully withstands impact testing against a flat anvil at a first drop of 23 ft/s and a second drop of 16.5 ft/s.

Figure 18:
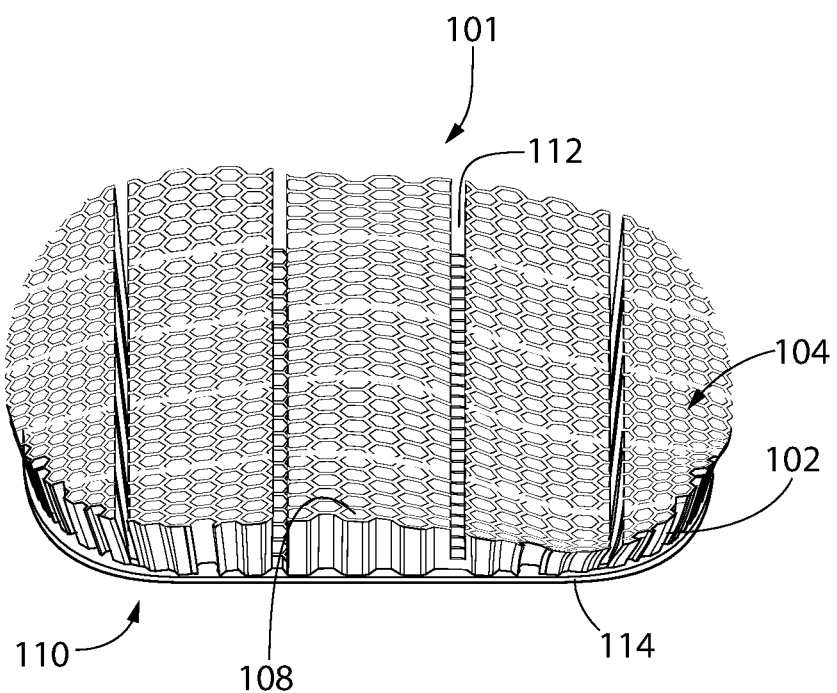
FIG. 18 is a top perspective view of an impact attenuation article comprising pre-crushed aluminum honeycomb, according to an embodiment of the invention, impacted on a hemi-anvil.

When a helmet is impacted on a hemispherical anvil, two basically round or compound surfaces are coming together and the contact is made almost at a point. Because the area of impact is so reduced, the crush strength of the honeycomb cannot be brought into play and total crushing at a point will take place before it should. FIG. 18 is a post-test drawing of a honeycomb impact pad after contact with a hemispherical anvil. This pad is smaller than the test article in FIG. 17.

Meeting different impact velocities with multiple impacts at the same location is a challenge due to the combination of impact energy levels, shell flexibility and the shape of the hemi anvil used for impact testing. In some embodiments, several plies of polymer 114 (e.g. CFRP), such as 5 layers, 7 layers, 10 layers, or more, may provide a stiffer surface to the impact attenuation article 101 that will distribute the point loading created by the hemi anvil and allow more honeycomb to be enlisted in absorbing the impact energy when defending against a hemi anvil.

In some embodiments an impact attenuation system 100 may comprise a first set of one or more impact attenuation articles 101 that are configured to be disposed in holes in liner body 120, a second set of one or more impact attenuation articles 101 that are configured to be disposed on an external surface of helmet 300. The first set of one or more impact attenuation articles 101 may be in accordance with any embodiment of impact attenuation article described herein and each of the one or more impact attenuation articles 101 of the first set of one or more impact attenuation articles may have a different or similar construction as the others. The second set of one or more impact attenuation articles 101 may be in accordance with any embodiment of impact attenuation article described herein and each of the one or more impact attenuation articles 101 of the second set of one or more impact attenuation articles may have a different or similar construction as the others. An arrangement of impact attenuation articles 101 disposed in impact liner body 120 and other impact attenuation articles 101 disposed on the external surface of a helmet 300 may meet both impact requirements against a flat anvil and may withstand increased velocities against a hemi anvil compared to an impact liner system 100 without impact attenuation articles 101 placed on the helmet's external surface. In one embodiment, one or more impact articles 101 disposed in impact liner body 120 comprise or consist essentially of a pre-crushed aluminum honeycomb sheet 102 and a polymer skin 114 disposed on bottom surface 106, wherein the polymer skin 114 comprises carbon fiber reinforced polymer (e.g. 5 or 10 layers of carbon fiber reinforced polymer). The impact article 101 may be curved such that the top surface 104 is a convex surface. In one embodiment, one or more impact articles 101 disposed on an external surface of helmet 300 comprise or consist essentially of a pre-crushed aluminum honeycomb sheet 102, a first polymer skin 114a disposed on bottom surface 106, wherein the first polymer skin 114a comprises carbon fiber reinforced polymer (e.g. 1, 2, 5, or 10 layers of carbon fiber reinforced polymer) and a second polymer skin 114b disposed on top surface 104, wherein the second polymer skin 114b comprises fiberglass. The impact article 101 configured to be disposed on an external surface of helmet 300 may be curved such that the top surface 104 is a concave surface. Such impact attenuation system 100 comprising multiple impact attenuation articles 101 may be provided as a kit.

EXAMPLES

Example 1. Drop Testing of Air Helmet

An EPS impact liner modified with PCAH/CFRP impact attenuation article was re-installed into a shell and drop tested as normal.

Table 1 shows the crush depth by location in the crown pad. "Pre" is the pre-test thickness of the PCAH 102, "Post" is the thickness of the PCAH 102 after the test and "Crushed" is the difference between the two. Impact was made in the center of the pad. Deceleration measured on the headform was 127.75 G at 16 ft/s where the requirement is a maximum of 150 G. The thickness results are presented where the top of the table is the rear as worn, so left and right appear reversed.

TABLE 1

Results for the crown insert impact at 16 ft/s

| | LEFT AND RIGHT ARE AS WORN | | CROWN REAR | DIMENSIONS ARE IN INCHES | |
|---|---|---|---|---|---|
| | R OUTSIDE | R INSIDE | CENTER | L INSIDE | L OUTSIDE |
| PRE | 0.647 | 0.606 | 0.563 | 0.600 | 0.646 |
| POST | 0.533 | 0.530 | 0.490 | 0.541 | 0.541 |
| CRUSHED | 0.114 | 0.076 | 0.073 | 0.059 | 0.105 |
| PRE | 0.656 | 0.573 | 0.562 | 0.573 | 0.655 |
| POST | 0.522 | 0.362 | 0.332 | 0.403 | 0.573 |
| CRUSHED | 0.134 | 0.211 | 0.230 | 0.170 | 0.082 |
| PRE | 0.660 | 0.595 | 0.572 | 0.595 | 0.658 |
| POST | 0.486 | 0.362 | 0.265 | 0.325 | 0.272 |
| CRUSHED | 0.174 | 0.233 | 0.307 | 0.270 | 0.386 |
| PRE | 0.668 | 0.622 | 0.581 | 0.622 | 0.666 |
| POST | 0.508 | 0.439 | 0.275 | 0.334 | 0.537 |
| CRUSHED | 0.160 | 0.183 | 0.306 | 0.288 | 0.129 |
| PRE | 0.705 | 0.635 | 0.596 | 0.632 | 0.712 |
| POST | 0.663 | 0.502 | 0.316 | 0.488 | 0.623 |
| CRUSHED | 0.042 | 0.133 | 0.280 | 0.144 | 0.089 |
| 127.75 G'S VERSUS A 150 G REQT AT 16 FPS | | | CROWN FRONT HGU-56/P REQT | | |

Table 2 shows the crush depth by location in a rear insert. "Pre" is the pre-test thickness of the PCAH 102, "Post" is the thickness of the PCAH 102 after the test and "Crushed" is the difference between the two. Impact was made in the center of the insert. Deceleration measured on the headform was 144.55 G at 19 ft/s where the requirement is a maximum of 175 G. The thickness results are presented where the top of the table is towards the crown, so left and right as worn appear reversed.

TABLE 2

Results for the rear insert impact at 19 ft/s.

| | LEFT AND RIGHT ARE AS WORN | | REAR TOP | DIMENSIONS ARE IN INCHES | |
|---|---|---|---|---|---|
| | R OUTSIDE | R INSIDE | CENTER | L INSIDE | L OUTSIDE |
| PRE | 0.705 | 0.684 | | 0.685 | 0.705 |
| POST | 0.463 | 0.461 | | 0.458 | 0.491 |
| CRUSHED | 0.242 | 0.223 | | 0.227 | 0.214 |
| PRE | 0.710 | 0.722 | 0.711 | 0.722 | 0.710 |
| POST | 0.494 | 0.304 | 0.252 | 0.319 | 0.443 |
| CRUSHED | 0.216 | 0.418 | 0.459 | 0.403 | 0.267 |
| PRE | 0.726 | 0.731 | 0.722 | 0.731 | 0.722 |
| POST | 0.456 | 0.269 | 0.180 | 0.257 | 0.534 |
| CRUSHED | 0.270 | 0.462 | 0.542 | 0.474 | 0.188 |
| PRE | 0.714 | 0.709 | 0.694 | 0.709 | 0.714 |
| POST | 0.416 | 0.285 | 0.180 | 0.359 | 0.569 |
| CRUSHED | 0.298 | 0.424 | 0.514 | 0.350 | 0.145 |
| PRE | 0.704 | 0.692 | 0.674 | 0.686 | 0.700 |
| POST | 0.630 | 0.493 | 0.410 | 0.483 | 0.578 |
| CRUSHED | 0.074 | 0.199 | 0.264 | 0.203 | 0.122 |
| 144.55 G'S VERSUS A REQT OF 175 G'S AT 19 FPS | | | REAR BOTTOM | | HGU-56/P REQT |

Table 3 shows the crush depth by location in the front insert. "Pre" is the pre-test thickness of the PCAH 102, "Post" is the thickness of the PCAH 102 after the test and "Crushed" is the difference between the two. Impact was made in the center of the insert. Deceleration measured on the headform was 110.12 G at 19 ft/s where the requirement is a maximum of 175 G. The thickness results are presented where the top of the table is towards the crown, so left and right as worn appear reversed. The top center location has no data because that square was cut out to allow attachment of part of the helmet suspension system.

TABLE 3

Results for the front insert impact at 19 ft/s.

LEFT AND RIGHT ARE AS WORN    FRONT TOP    DIMENSIONS ARE IN INCHES

|         | OUTSIDE | R INSIDE | CENTER | L INSIDE | L OUTSIDE |
|---------|---------|----------|--------|----------|-----------|
| PRE     | 0.773   | 0.746    | 0.713  | 0.746    | 0.773     |
| POST    | 0.753   | 0.566    | 0.581  | 0.635    | 0.693     |
| CRUSHED | 0.020   | 0.180    | 0.132  | 0.111    | 0.080     |
| PRE     | 0.784   | 0.769    | 0.733  | 0.769    | 0.784     |
| POST    | 0.67    | 0.54     | 0.455  | 0.604    | 0.587     |
| CRUSHED | 0.114   | 0.229    | 0.278  | 0.165    | 0.197     |
| PRE     | 0.781   | 0.779    | 0.753  | 0.779    | 0.781     |
| POST    | 0.586   | 0.291    | 0.209  | 0.403    | 0.555     |
| CRUSHED | 0.195   | 0.488    | 0.544  | 0.376    | 0.226     |
| PRE     | 0.805   | 0.788    | 0.781  | 0.788    | 0.789     |
| POST    | 0.61    | 0.334    | 0.245  | 0.26     | 0.492     |
| CRUSHED | 0.195   | 0.454    | 0.536  | 0.528    | 0.297     |
| PRE     | 0.805   | 0.805    | 0.781  | 0.805    | 0.805     |
| POST    | 0.53    | 0.38     | 0.376  | 0.426    | 0.523     |
| CRUSHED | 0.275   | 0.425    | 0.405  | 0.379    | 0.282     |

110.12 G'S VERSUS A 175 G REQT AT 19 FPS FRONT BOTTOM HGU-56/P REQT

Example 2. Drop Testing of Ground Helmet

The ground helmets were tested at ambient conditions at 10.1 ft/s and deceleration averages of 69 G and 80 G were seen where the requirement is 150 G.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words "right", "left", "lower" and "upper" designate directions in the drawings to which reference is made. The words "inwardly" and "outwardly" refer to directions toward and away from, respectively, the geometric center of the impact attenuation system. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

We claim:

1. An impact liner system for a helmet comprising:
an impact attenuation article comprising:
   an aluminum honeycomb sheet having a top surface and a bottom surface, the aluminum honeycomb sheet defining a plurality of approximately hexagonally shaped cells,
   wherein the bottom surface defines a single sheet of contiguous cells and the top surface defines a first island of contiguous cells having a first side, a second side, a third side, and a fourth side, the first side being separated from a second island of contiguous cells by a first slit, the second side being separated from a third island of contiguous cells by a second slit, the third side being separated from a fourth island of contiguous cells by a third slit, and the fourth side being separated from a fifth island of contiguous cells by a fourth slit, the first slit intersecting the second slit and the fourth slit, the second slit intersecting the third slit, and the third slit intersecting the fourth slit,
   wherein the first island, the second island, the third island, the fourth island, and the fifth island each include a plurality of contiguous cells, and
   wherein the cells of the contiguous cells are generally hollow.

2. The impact liner system of claim 1 further comprising:
a liner body having one or more holes, wherein the aluminum honeycomb sheet is disposed in the one or more holes of the liner body.

3. The impact liner system of claim 2, wherein the impact attenuation article provides a first amount of impact attenuation at a first location and a second amount of impact attenuation at a second location, wherein the second amount is greater than the first amount.

4. The impact liner system of claim 1, wherein two or more of the first island, the second island, the third island, the fourth island, and the fifth island are approximately rectangular in shape.

5. The impact liner system of claim 1, wherein two or more of the first island, the second island, the third island, the fourth island, and the fifth island are approximately 2 cm wide by 2 cm long.

6. The impact liner system of claim 1, wherein the aluminum honeycomb sheet further has a bottom portion that extends from the bottom surface to the one or more slits, wherein the bottom portion is approximately 16 mm thick in a vertical direction.

7. The impact liner system of claim 1, wherein the top surface has a convex curvature and the bottom surface has a concave curvature.

8. The impact liner system of claim 1, further comprising a polymer skin covering at least a portion of one of the top surface and bottom surface of the aluminum honeycomb sheet.

9. The impact liner system of claim 8, further comprising a second polymer skin covering at least a portion of one of the top surface and the bottom surface of the aluminum honeycomb sheet that is not covered by the polymer skin.

10. The impact liner system of claim 8, wherein the polymer skin comprises a carbon fiber reinforced polymer.

11. The impact liner system of claim 8, wherein the polymer skin comprises fiberglass.

12. The impact liner system of claim 8, further comprising an adhesive covering at least a portion of one of the top surface and bottom surface of the aluminum honeycomb sheet.

13. The impact liner system of claim 12, wherein the adhesive comprises a plurality of hooks or loops.

14. The impact liner system of claim 1, further comprising a liner body comprising an impact-absorbing material and having an outer surface with a convex curvature and an interior surface with a concave curvature, wherein the impact attenuation article is disposed in the liner body.

15. The impact liner system of claim 14, wherein the impact attenuation article is disposed in a hole of the liner body such that the top surface is generally aligned with the outer surface of the liner body and the bottom surface is generally aligned with the interior surface of the liner body.

16. The impact liner system of claim 1, wherein the first side is opposed from the third side and the second side is opposed from the fourth side.

17. The impact liner system of claim 1, wherein the first side is parallel to the third side and perpendicular to the second side, and the second side is parallel to the fourth side.

18. The impact liner system of claim 1, wherein the first slit, the second slit, the third slit, and the fourth slit each extend partially through the aluminum honeycomb sheet from the top surface toward the bottom surface.

19. The impact liner system of claim 1, wherein the first slit, the second slit, the third slit, and the fourth slit each extend partially through the aluminum honeycomb sheet from a bottom portion toward the top surface.

20. The impact liner system of claim 1, wherein the impact attenuation article is a first impact attenuation article, the impact liner system further comprising:
a second impact attenuation article separate from the first impact attenuation article and comprising an aluminum honeycomb sheet having a top surface and a bottom surface, the aluminum honeycomb sheet of the second impact attenuation article defining a plurality of approximately hexagonally shaped cells, wherein the bottom surface of the second impact attenuation article defines a single sheet of contiguous cells and the top surface of the second impact attenuation article defines a first island of contiguous cells having a first side, a second side, a third side, and a fourth side, the first side being separated from a second island of contiguous cells by a first slit, the second side being separated from a third island of contiguous cells by a second slit, the third side being separated from a fourth island of contiguous cells by a third slit, and the fourth side being separated from a fifth island of contiguous cells by a fourth slit, the first slit intersecting the second slit and the fourth slit, the second slit intersecting the third slit, and the third slit intersecting the fourth slit.

21. The impact liner system of claim 20, further comprising a liner body having one or more holes, wherein the aluminum honeycomb sheet of the second impact attenuation article is disposed in the one or more holes of the liner body.

22. The impact liner system of claim 21, wherein the second impact attenuation article provides a first amount of impact attenuation at a first location and a second amount of impact attenuation at a second location, wherein the second amount is greater than the first amount.

23. The impact liner system of claim 20, wherein two or more of the first island, the second island, the third island, the fourth island, and fifth island of the second impact attenuation article are approximately rectangular in shape.

24. The impact liner system of claim 20, wherein two or more of the first island, the second island, the third island, the fourth island, and fifth island of the second impact attenuation article are each approximately 2 cm wide by 2 cm long.

25. The impact liner system of claim 24, wherein the aluminum honeycomb sheet of the second impact attenuation article further has a bottom portion that extends from the bottom surface of the aluminum honeycomb sheet of the second impact attenuation article to the one or more slits, wherein the bottom portion is approximately 16 mm thick in a vertical direction.

26. The impact liner system of claim 20, wherein the top surface of the second impact attenuation article has a convex curvature and the bottom surface of the second impact attenuation article has a concave curvature.

27. The impact liner system of claim 20, the second impact attenuation article further comprising a polymer skin covering at least a portion of one of the top surface and bottom surface of the aluminum honeycomb sheet of the second impact attenuation article.

28. The impact liner system of claim 27, the second impact attenuation article further comprising a second polymer skin covering at least a portion of one of the top surface and the bottom surface of the aluminum honeycomb sheet of the second impact attenuation article that is not covered by the polymer skin.

29. The impact liner system of claim 27, wherein the polymer skin comprises a carbon fiber reinforced polymer.

30. The impact liner system of claim 27, wherein the polymer skin comprises fiberglass.

31. The impact liner system of claim 20, wherein the first side of the second attenuation article is opposed from the third side of the second attenuation article and the second side of the second attenuation article is opposed from the fourth side of the second attenuation article.

32. The impact liner system of claim 20, wherein the first side of the second attenuation article is parallel to the third side of the second attenuation article and perpendicular to the second side of the second attenuation article, and the second side of the second attenuation article is parallel to the fourth side of the second attenuation article.

33. A helmet comprising:
the impact liner system of claim 1.

* * * * *